US005663752A

United States Patent [19]
Imamura et al.

[11] Patent Number: 5,663,752
[45] Date of Patent: Sep. 2, 1997

[54] INK JET HEAD FREE OF DEBONDING BETWEEN A SUBSTRATE AND INK FLOW PATH WALLS FORMED ON SAID SUBSTRATE

[75] Inventors: Isao Imamura; Akihiko Shimomura, both of Yokohama; Shoji Shiba, Sagamihara, all of Japan

[73] Assignee: Canon Kabushiki Kaisha, Tokyo, Japan

[21] Appl. No.: 348,255

[22] Filed: Nov. 28, 1994

[30] Foreign Application Priority Data

Nov. 26, 1993 [JP] Japan .................. 5-296220
Nov. 25, 1994 [JP] Japan .................. 6-291312

[51] Int. Cl.⁶ .................................. B41J 2/135
[52] U.S. Cl. .................................. 347/65
[58] Field of Search ................ 347/63, 64, 65

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,657,631 | 4/1987 | Noguchi | 156/655 |
| 4,689,640 | 8/1987 | Shimomura | 346/140 R |
| 4,723,129 | 2/1988 | Endo et al. | 346/1.1 |
| 4,740,796 | 4/1988 | Endo et al. | 346/1.1 |
| 5,331,344 | 7/1994 | Miyagawa et al. | 347/63 |
| 5,335,004 | 8/1994 | Matsushita | 347/44 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Valerie A. Lund
*Attorney, Agent, or Firm*—Fitzpatrick, Cella, Harper & Scinto

[57] ABSTRACT

An ink jet head having a plurality of ink flow path walls forming a plurality of ink pathways by joining said plurality of ink flow path walls to a substrate for an ink jet head, said plurality of ink flow path walls being tightly bonded to said substrate without being debonded even in the case of continuously operating the ink jet head over a long period of time using highly alkaline ink. The ink jet head includes a plurality of discharging outlets serving to discharge ink; a substrate for an ink jet head, said substrate including a plurality of energy generating elements capable of generating energy for discharging ink from said plurality of discharging outlets and wiring electrically connected to said energy generating elements; and a plurality of ink pathways each having an ink flow path wall forming one of the ink pathways by joining to said substrate, characterized in that each of the ink flow path walls is constituted by a specific epoxy resin composition (a) which is in the liquid state at room temperature, said epoxy resin composition (a) comprising (b) a hardening epoxy resin in the liquid state at room temperature as a main component and (c) an epoxy resin with a diepoxide structure having a siloxane bond incorporated into said epoxy resin (b).

34 Claims, 14 Drawing Sheets

INK JET HEAD FREE OF DEBONDING BETWEEN A SUBSTRATE AND INK FLOW PATH WALLS FORMED ON SAID SUBSTRATE

BACKGROUND OF THE INVENTION

1. Field of the Invention

The present invention relates to an improvement in an ink jet head for discharging ink which is applied to an ink jet system. More particularly, the present invention relates to an improved ink jet head free of debonding between a substrate for an ink jet head and ink flow path walls formed on said substrate. The present invention includes an ink jet apparatus which is provided with said ink jet head.

2. Description of Related Background Art

In recent years, progressively increasing attention has been paid to an ink jet system for conducting printing on a printing medium by discharging ink droplets towards said printing medium, since it can provide high speed, high density and high definition printing of a high quality with low noise and is suitable for color printing and also for compact designing.

An ink jet head which serves as a mechanism for discharging ink in such ink jet system is the most important factor in the ink jet system. The ink jet head has an extremely precise structure. Description will be made of such ink jet head with reference to FIG. 4. FIG. 4 is a schematically exploded view illustrating an example of the construction of the ink jet head.

In FIG. 4, reference numeral 101 indicates a silicon substrate for an ink jet head, having an electrothermal converting element as a discharging energy-generating element including head generating resistors 103 and wiring 102 for said heat generating resistors formed on said silicon substrate by means of the thin-film forming technique. On the silicon substrate 101 having the electrothermal converting element thereon, there is disposed an ink flow path wall made of a photosensitive resin or the like, forming ink pathway walls 104a and a common ink chamber wall 104b. Reference numeral 105 indicates a top plate joined onto the ink flow path wall 104 such that it covers concavities formed by the ink flow path wall 104 to form ink pathways 108a and a common ink chamber 108b. Each ink pathway 108a contains the above-described heat generating resistor 103 positioned therein. Reference numeral 109 indicates an ink discharging outlet positioned at an end portion of the silicon substrate which communicates with the ink pathway 108a. Reference numeral 107 indicates a common ink supply port disposed at the top plate 105. The common ink supply port 107 is covered by a filter 106 for ink which is fixed to the top plate 107.

There are various proposals for the process of producing an ink jet head of the construction above described. U.S. Pat. No. 4,657,631 describes a typical process for producing such an ink jet head.

The process described in this patent document will be described with reference to FIG. 1.

The process for producing an ink jet head according to the above patent document comprises the following six steps:

step 1 (see, FIG. 1(a)) wherein a substrate 1 for an ink jet head which is provided with an energy generating element serving for discharging ink is provided, and a photosensitive resin layer 2 (comprising a positive type photoresist) is formed on the substrate 1;

step 2 (see, FIG. 1(b)) wherein the photosensitive resin layer 2 formed in step 1 is subjected to light exposure through a patterning mask;

step 3 (see, FIG. 1(c)) wherein the photosensitive resin layer 2 having been subjected to light exposure in step 2 is patterned by way of subjecting said resin layer, whereby a plurality of relief solid layers 4 (that is, a plurality of relief patterns) are formed at respective positions on the substrate 1 where ink flow paths are to to be formed;

step 4 (see, FIG. 1(d)) wherein a ink flow path wall-forming material 5 comprising a hardening resin is disposed to cover the relief solid layers 4 formed in step 3;

step 5 (see, FIG. 1(e)) wherein the hardening resin is hardened; and step 6 (see, FIG. 1(f)) wherein the relief solid layers 4 are removed by way of dissolving them using an appropriate organic solvent such as halogen-containing hydrocarbon, ketone, ester, or alcohol or an aqueous alkali solution of potassium hydroxide or the like; whereby an ink jet head is completed.

In the above-described process for producing an ink jet head, there is usually used a hardening resin as the ink flow path wall-forming material 5 as above described. However, a problem arises in this case in that a cure shrinkage is liable to occur upon hardening of the hardening resin, wherein shrinkage stress is unavoidable. Also, such hardening resin is somewhat swollen when contacted with ink. This swelling of the hardening resin provides a stress in accordance with a change in the environmental temperature, particularly upon operating the ink jet head.

In the case of an ink jet head having ink flow path walls comprised of the hardening resin, debonding is liable to occur between the ink flow path walls and the substrate when the ink jet head is repeatedly used, because of the above described stress. This debonding entails a loss in the discharging energy to the ink pathways, wherein in the worst case, the discharging energy becomes insufficient such that no ink is discharged from a discharging outlet. Therefore, in the production of an ink jet head, an appropriate ink flow path wall-forming material is selectively used in order to prevent in the ink flow path walls from being debonded from the substrate.

In order that the ink flow path walls are prevented from being debonded from the substrate, there is known a method wherein wherein the ink flow path walls are formed with the use of an ink path wall-forming material having a reduced elasticity modulus so that they can absorb the foregoing stress provided in accordance with the change in the environmental temperature and another method wherein the ink flow path walls are formed with the use of an ink path wall-forming material which is slightly swollen with ink so that they slightly provide such stress due to a change in the environmental temperature. However, neither of these two methods is sufficiently effective in practice. That is, such ink flow path wall-forming material having a reduced elasticity modulus is relatively large in terms of the swelling magnitude to ink and because of this, the ink flow path walls in accordance with either of the two methods are insufficient in terms of their stress absorbing efficiency.

Thus, it is necessary for the ink flow path walls to be formed of a specific hardening resin having a relevant elasticity modulus while satisfying conditions relating to the swelling property to ink and the stress absorbing efficiency.

Now, the swelling property of the ink flow path wall-forming material to ink can be referred to as "ink resistance". An ink flow path wall-forming material having a high swelling property to ink, can be considered to be low in ink resistance. On the other hand, an ink flow path wall-forming material having a low swelling property to ink can be considered to be high in ink resistance.

As described above (see, FIG. 1(d)), the ink flow path wall-forming material is applied to cover the relief solid layers (that is, the relief patterns), for example, by means of a dispenser. In the case where a plurality of ink pathways are intended to be arranged at an increased density, it is necessary for the relief patterns to be miniaturized in order to attain this purpose. In this case, the ink flow path wall-forming material is required to be of a low viscosity so that it can sufficiently get into spaces among those miniaturized relief patterns. The use of an ink flow path wall-forming material having a low viscosity in this case is advantageous in that air bubbles are rarely taken in upon the application of thereof. However, the relief patterns (that is, the relief solid layers), which serve to form a plurality of ink pathways, are usually formed of a positive type photoresist as described above. Thus, in the case where the ink flow path wall-forming material contains an organic solvent, the shapes of the relief solid layers are liable to be deformed because of the organic solvent, wherein precise ink pathways cannot be formed. Therefore, in order for the ink flow path wall-forming material to have a desired viscosity, it is desired to use an appropriate solvent-free material in the liquid state at room temperature and which has a low viscosity and is capable of serving as the ink flow path wall-forming material.

In the prior art, epoxy resin has been used as the ink flow path wall-forming material since it has excellent ink resistance and in the liquid state at room temperature. The epoxy resin is corresponding to the foregoing ink flow path wall-forming material has excellent ink resistance but has a high elasticity modulus. In the case of an ink jet head having a plurality of ink flow path walls formed of epoxy resin, there is a problem in that the ink flow path walls are sometimes debonded from the substrate. Particularly, in the case of producing an ink jet head in which a plurality of energy generating elements are arranged at an increased density, the interval between each adjacent energy generating element is remarkably shortened and because of this, the width of each ink flow path wall comprised of epoxy resin is necessary to be thinned accordingly. In this case, there is a problem in that because the area of each ink flow path wall to be contacted with the substrate eventually becomes small, a sufficient adhesion is difficult to maintain between the ink flow path wall and the substrate. In addition to this, another problem is in that because the epoxy resin has a high elasticity modulus, a shrinkage stress effected upon hardening it cannot be sufficiently absorbed, often resulting debonding between the ink flow path walls and the substrate.

In order that the epoxy resin can absorb the foregoing shrinkage stress, the epoxy resin must be modified such that it has a reduced elasticity modulus. For this purpose, there can be considered a method wherein the epoxy resin is replaced by a silicone-modified epoxy resin. However, the silicone-modified epoxy resin is remarkably low in elasticity modulus and because of this, there cannot be attained the desired bonding strength required for the ink flow path wall-forming material. In addition to this, the silicone-modified epoxy resin is insufficient in terms of mechanical strength. In this connection, silicone-modified epoxy resin has never been used as a constituent material of an ink jet head. In order for the epoxy resin to have a reduced elasticity modulus, an appropriate flexibilizer is usually incorporated thereinto.

In the ink jet system field in recent years, there have been used as the printing medium various printing members such as plastic sheets, fabrics and the like other than paper. Along with this, there is an increased demand for improving ink to be used in the ink jet system in terms of its color development and water resistance. In order to meet this demand, there is often used ink containing a slightly water-soluble dye or/and a pigment which is low in dispersion stability instead of ordinary ink.

However, full use of such dye and pigment cannot be attained in the case where an ordinary solvent is used. In order to solve this problem, there is a proposal of incorporating an alkali salt such as lithium hydroxide into the solvent to heighten the pH value of the ink (that is, to make the ink highly alkaline) whereby making full use of such dye and pigment.

The results of experimental studies by the present inventors revealed that a conventional ink jet head having a plurality of ink flow path walls formed of an epoxy resin containing a flexibilizer is liable to provide prints accompanied by defects when it is operated using highly alkaline ink over a long period of time and wherein debonding is liable to occur between the ink flow path walls and the substrate. This situation will be detailed later.

SUMMARY OF THE INVENTION

The present invention is aimed at resolving the foregoing problems found in the conventional ink jet head and providing an improved ink jet head capable of continuously performing stable ink discharge over a long period of time even in the case wherein highly alkaline ink is used.

Another object of the present invention is to provide an improved ink jet head having a plurality of ink flow path walls having excellent ink resistance and which are not debonded from the substrate even when continuously used over a long period of time using highly alkaline ink.

A further object of the present invention is to provide an improved, elongated ink jet head having a number of highly precise ink pathways arranged at an increased arrangement density.

A further object of the present invention is to provide a highly reliable ink jet head which can be efficiently produced at a reduced production cost.

An ink jet head according to the present invention which attains the above objects includes: a plurality of discharging outlets serving to discharge ink (that is, a plurality of ink discharging outlets); a substrate for an ink jet recording head including a plurality of energy generating elements capable of generating energy for discharging ink from said ink discharging outlets and wiring electrically connected to said energy generating elements; and a plurality of ink pathways each having an ink flow path wall forming one of the ink pathways by joining to said substrate, characterized in that each of the ink flow path walls is constituted by a specific epoxy resin composition which is in the liquid state at room temperature, said epoxy resin composition comprising (a) a hardening epoxy resin in the solid state at room temperature as a main component and (b) an epoxy resin with a diepoxide structure having a siloxane bond (this latter epoxy resin will be hereinafter referred to as diepoxide structure possessing epoxy resin) incorporated into said epoxy resin (a).

2(h)-2, 2(i)-1, 2(i)-2, 2(j)-1, 2(j)-2 are schematic views for explaining a process for producing an ink jet head according to the present invention.

Figure 3A:
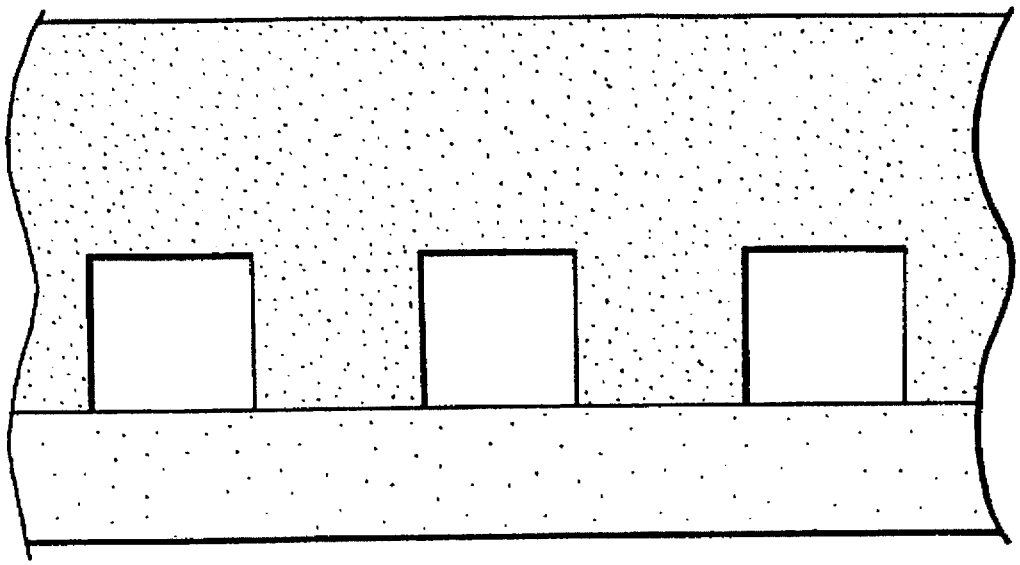

FIG. 3(a) is a schematic cross-sectional view of a discharging outlet portion of an ink jet head produced in each of Examples 1 and 2 which will be later described.

Figure 3B:
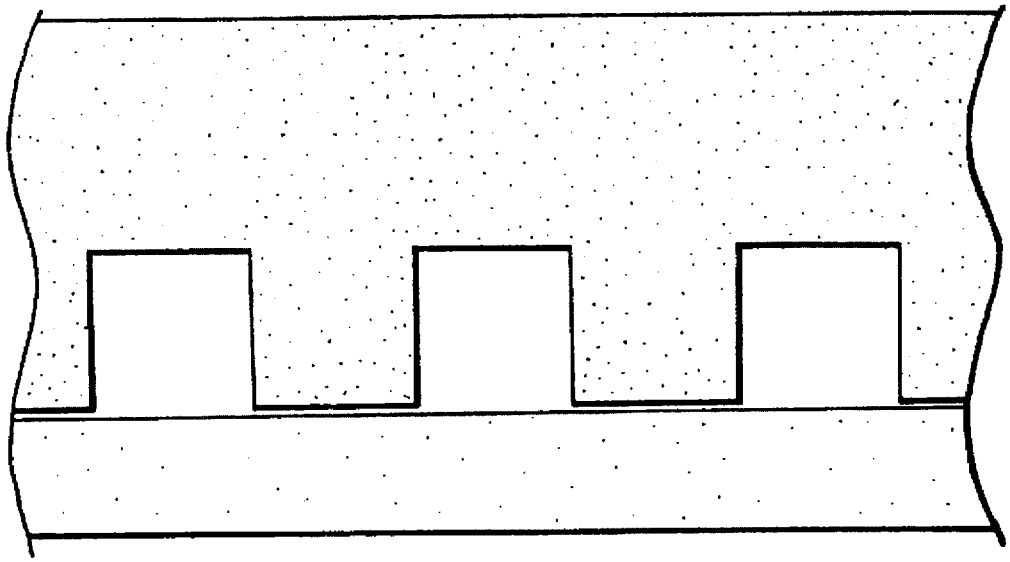

FIG. 3(b) is a schematic cross-sectional view of a discharging outlet portion of an ink jet head produced in each of Comparative Examples 1 and 2 which will be later described.

Figure 4:
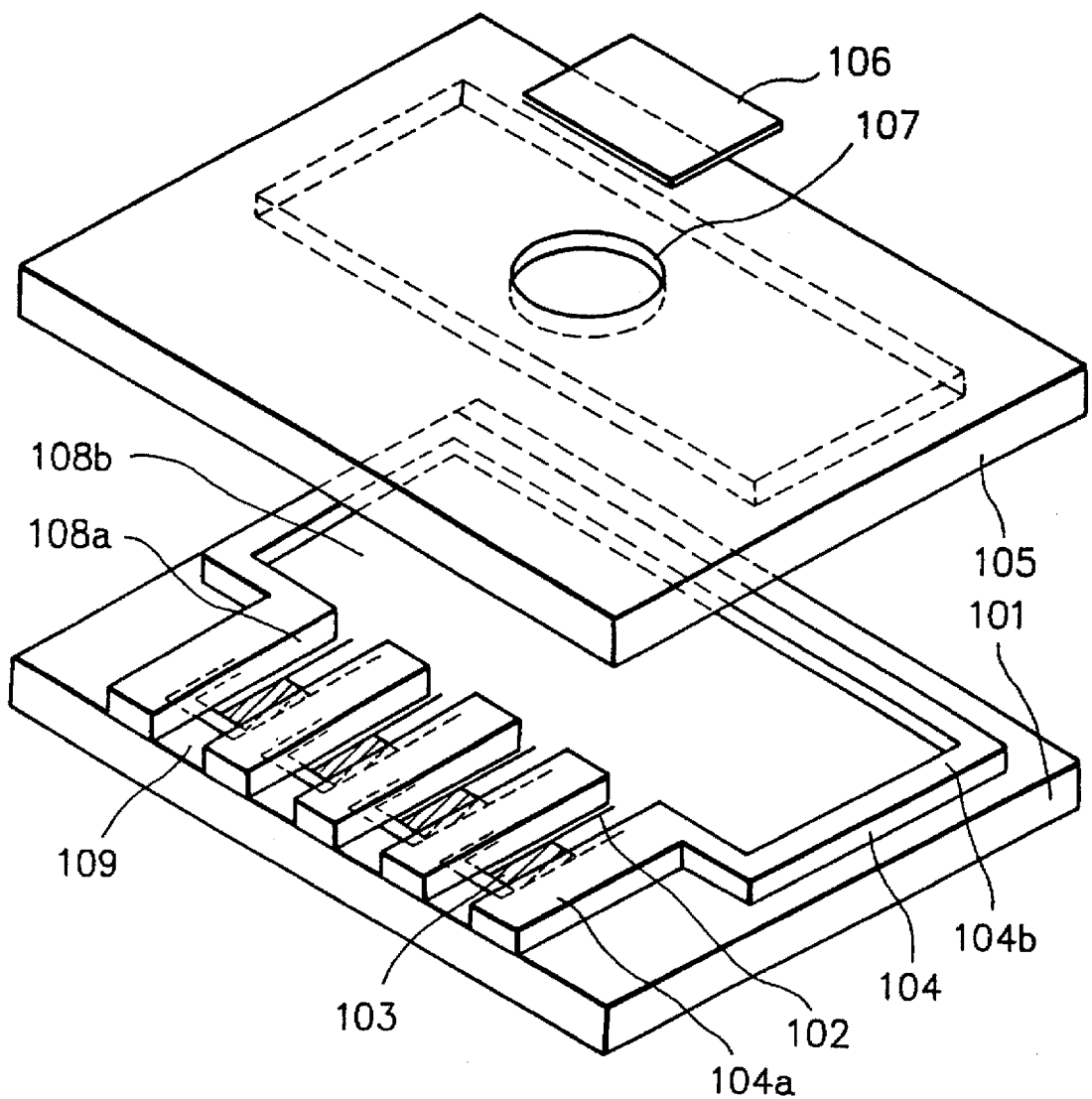

FIG. 4 is a schematically exploded view illustrating an example of the constitution of a conventional ink jet head.

Figure 5:
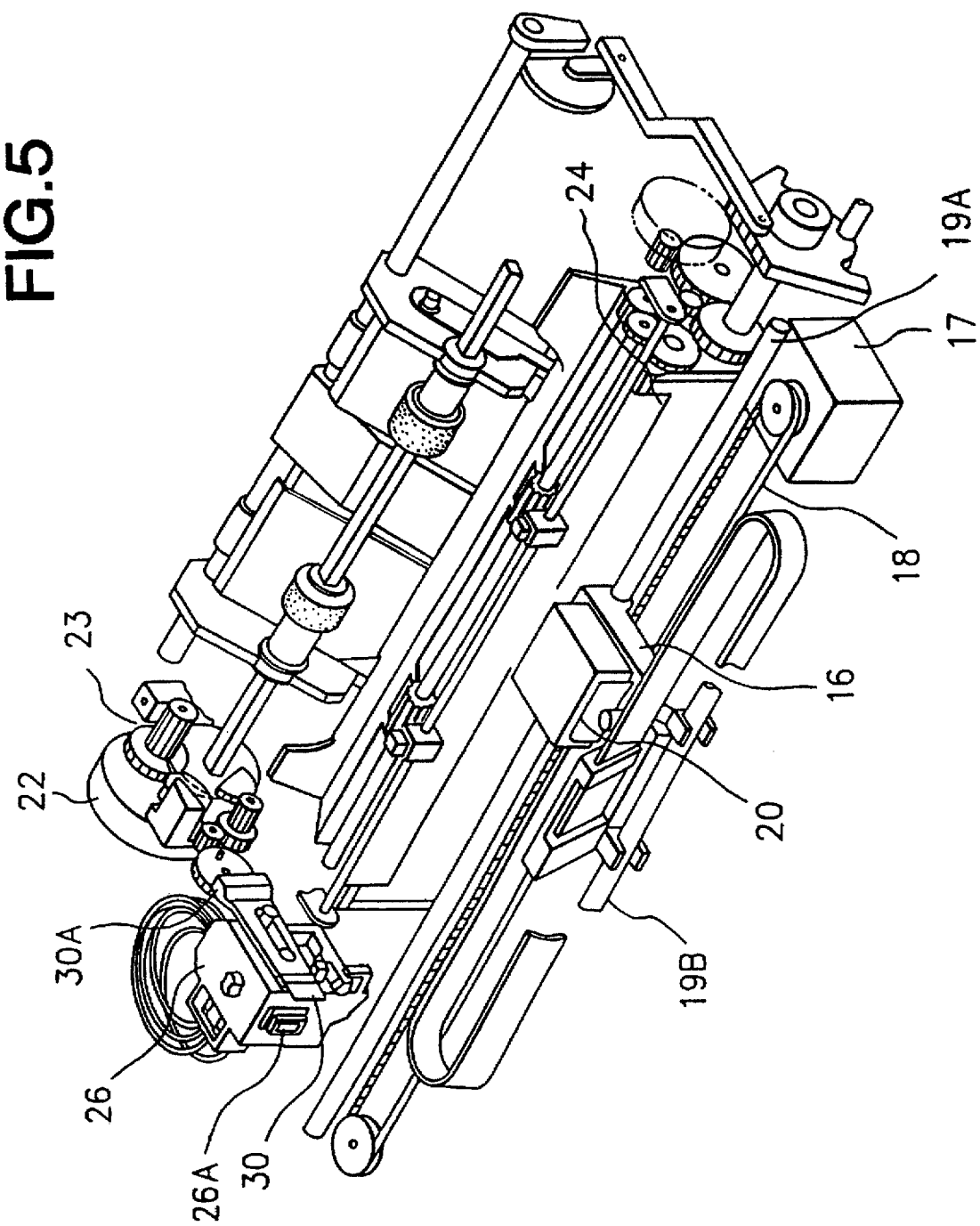

FIG. 5 is a schematic diagram of an ink jet apparatus in which an ink jet head according to the present invention can be installed.

DESCRIPTION OF THE INVENTION AND THE PREFERRED EMBODIMENTS

The present inventors made extensive studies in order to solve the foregoing problems in the prior art and in order to attain the foregoing objects.

That is, the present inventors prepared a plurality of conventional ink jet heads having a plurality of ink flow path walls formed of a resin composition comprising epoxy resin incorporated with a flexibilizer.

As for some of the ink jet heads, examination was made of their ink jet printing performance by continuously operating the ink jet head over a long period using ordinary ink.

As for the remaining ink jet heads, examination was made of their ink jet printing performance by continuously operating the ink jet head over a long period using highly alkaline ink containing a slightly water-soluble dye, a pigment and an alkali salt.

In the case where the ordinary ink was used, each of the ink jet heads used was found to perform desirable printing over a long period of time.

However, in the case where the highly alkaline ink was used, each of the ink jet heads used was found to sometimes provide prints accompanied by defects after repeated use over a long period of time. As for each of the ink jet heads repeatedly operated over a long period of time using the highly alkaline ink, observation was made through its discharging outlet side. As a result, there was found occurrence of a debonding between the ink flow path walls and the substrate for each of the ink jet heads.

Based on the results obtained, the reason why the debonding occurred between the ink flow path walls and the substrate in the case using the highly alkaline ink is considered to be the constituent resin of the ink flow path walls which is poor in resistance to the highly alkaline ink.

Now, as described above, the epoxy resin as the main constituent of the resin composition by which the ink flow path walls are constituted has excellent ink resistance. Therefore, it is considered that the debonding of the ink flow path walls from the substrate is chiefly due to the flexibilizer contained in the resin composition.

In view of this, the present inventors made studies in order to find an appropriate material capable of serving to reduce the elasticity modulus of the epoxy resin in the liquid state at room temperature which is conventionally used as the constituent material of the ink flow path walls in a conventional ink jet head, instead of the flexibilizer. As a result, it was found that when a given amount of an epoxy resin with a diepoxide structure having a siloxane bond (this epoxy resin will be hereinafter referred to as "siloxane bond possessing epoxy resin") is incorporated into a hardening epoxy resin in the liquid state at room temperature, there is provided a desirable resin composition in which the elasticity modulus of the hardening epoxy resin is reduced as desired and that the resin composition enables formation of desirable ink flow path walls which have excellent resistance to not only the ordinary ink but also the foregoing highly alkaline ink.

The present invention has been accomplished based on these findings.

The present invention provides an ink jet head including: a plurality of discharging outlets serving to discharge ink (hereinafter referred to as ink discharging outlets); a substrate for an ink jet recording head including a plurality of energy generating elements capable of generating energy for discharging ink from said ink discharging outlets and wiring electrically connected to said energy generating elements; and a plurality of ink pathways each having an ink flow path wall forming one of the ink pathways by joining to said substrate, characterized in that each of the ink flow path walls is constituted by (a) a specific epoxy resin composition comprising (b) a hardening epoxy resin in the liquid state at room temperature as a main component and (c) a siloxane bond possessing epoxy resin (that is, an epoxy resin with a diepoxide structure having a siloxane bond) in a given amount. The epoxy resin composition will be hereinafter occasionally referred to as "ink flow path wall-forming material".

The ink flow path walls formed of the above described specific resin composition (a) are apparently superior to the conventional ink flow path walls comprised of the epoxy resin incorporated with a flexibilizer especially in terms of their resistance to not only the ordinary ink but also highly alkaline ink. Further, the specific resin composition (a) enables formation of highly precise ink pathways which are superior to ink pathways formed of the epoxy resin incorporated with the flexibilizer. Particularly, the use of the siloxane bond possessing epoxy resin (c) in an amount equivalent to that of the flexibilizer incorporated into the epoxy resin reduces the viscosity of the ink flow path wall-forming material (that is, the resin composition (a)) to a value corresponding to 1/10 of that of the epoxy resin incorporated with the flexibilizer, and no air bubbles are taken into the resin composition (a) as the ink flow path wall-forming material upon the application thereof at the time of forming ink flow path walls. This situation makes it possible to form highly precise ink flow path walls without conducting deaeration.

As described above, the ink flow path wall-forming material according to the present invention comprise the foregoing specific resin composition (a) (comprising a hardening epoxy resin (b) in the liquid state at room temperature as a main component and a siloxane bond possessing epoxy resin (c)). The resin composition (a) contains a curing agent or/and a polymerization initiator. If necessary, the resin composition (a) may contain a silane coupling agent capable of improving the adhesion of the resin composition.

The hardening epoxy resin (b) in the liquid state at room temperature as the main component of the resin composition (a) means a hardening epoxy resin having a viscosity of 10 to 100,000 cps at room temperature (25° C.). Thus, the hardening epoxy resin (b) can include hardening epoxy resins in the semisolid state at room temperature.

As the hardening epoxy resin (b), any known hardening epoxy resins may be used as long as they have two or more epoxy groups in one molecule and are in the liquid state or the semisolid state at room temperature. Of these hardening epoxy resins, from the viewpoint of ink resistance, those having a molecular weight of 300 or more are the most desirable.

Specific examples of the hardening epoxy resin (b) are bisphenol A type epoxy resins, bisphenol F type epoxy resins, bisphenol AD type epoxy resins, bisphenol AF type epoxy resins, and novolak type epoxy resins. These resins may be used either singly or in a combination of two or more of them.

The siloxane bond possessing epoxy resin (c) (that is, the epoxy resin with a diepoxide structure having a siloxane bond) used in the present invention may be epoxy resins obtained by a method of reacting an appropriate compound having a Si-OH bond with epichlorohydrin in an alkaline aqueous solution or another method of subjecting dimethyl polysiloxane having a Si-H group and an unsaturated epoxy compound such as acrylic glycidyl ether or vinylcyclohexane oxide to addition condensation in the presence of a platinum catalyst. It is possible to use any commercially available epoxy resins having a diepoxide structure with a siloxane bond such as 1,3-bis(3-glycidoxypropyl) tetramethyldisiloxane (trade name: B2405, produced by Chisso Kabushiki Kaisha).

Those siloxane bond possessing epoxy resins having an excessively high molecular weight are not usable in the present invention because they are relatively high in viscosity and are low in ink resistance. And those silane bond possessing epoxy resins having an excessively small molecular weight are not usable in the present invention because they are of a low boiling point and cannot be stably maintained in the liquid state at room temperature.

Specific examples of the siloxane bond possessing epoxy resin (c) desirably usable in the present invention are those having the following structural formula (I) or (II).

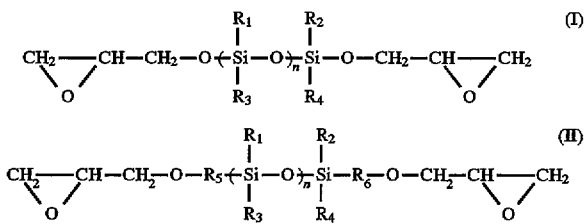

(wherein, each of $R_1$ to $R_4$ is an alkyl group of 1 to 4 carbon atoms, an alkenyl group of 2 to 6 carbon atoms, a phenyl group, or a substituted aromatic group wherein $R_1$ to $R_4$ may be the same or different from each other; each of $R_5$ and $R_6$ is an alkylene group of 1 to 8 carbon atoms, or a phenylene group wherein $R_5$ and $R_6$ may be the same or different from the each; n is an integer of 1 to 1000.)

The following describes an example of the production of an epoxy resin (c) having a diepoxide structure with a siloxane bond.

Firstly, there is provided a reaction vessel equipped with an agitator, a temperature gauge, a dropping funnel and a device capable of condensing and separating an azeotropic mixture of epichlorohydrin and water and returning an epichlorohydrin phase to the reaction vessel. Into the reaction vessel, a given amount of 1,1,3,3-tetramethyl-1,3-diethoxydisilazane and a given amount of epichlorohydrin are introduced and the resultant mixture is circulated while stirring the mixture and while maintaining the mixture at a desired temperature. A given amount of an aqueous solution of NaOH is then dropwise added while maintaining the contents at a desired temperature. Then, of the water and epichlorohydrin distilled, only the epichlorohydrin phase is returned to the reaction vessel. After the addition of the NaOH aqueous solution has been completed, the excess epichlorohydrin is recovered. Thereafter a given amount of toluene is added, followed by washing with water, wherein any salt and the residual alkali are removed. The resultant is subjected to treatment under reduced pressure while heating, wherein the toluene and a by-product (ethylglycidyl ether) are removed. Thus, there is obtained a product comprising an epoxy resin having a diepoxide structure with a siloxane bond (1,1,3,3-tetramethyl-1, 3-diglycidyletherdisiloxane).

The resin composition (a) (comprising the hardening epoxy resin (b) in the liquid state at room temperature as a main component and the siloxane bond possessing epoxy resin (c)) as the ink flowpath wall-forming material in the present invention is desired to contain the siloxane bond possessing epoxy resin (c) in an amount of 10 to 40 wt. % versus the total amount of the hardening epoxy resin (b) and the siloxane bond possessing epoxy resin (c). In the case where the amount of the siloxane bond possessing epoxy resin (c) is less than 10 wt. %, the ink flow path wall-forming material has a relatively high elasticity modulus, and because of this, the ink flow path wall-forming material cannot sufficiently absorb a shrinkage stress caused upon forming ink flow path walls. In an ink jet head having the resulting ink flow path walls thus formed, debonding is liable to occur at the interface between the ink flow path walls and the substrate when the ink jet head is continuously operated over a long period of time using the foregoing highly alkaline ink. On the other hand, in the case where the amount of the siloxane bond possessing epoxy resin (c) exceeds 40 wt. %, it takes a remarkable period of time until the ink flow path wall-forming material is hardened upon forming ink flow path walls, wherein a desired yield cannot be attained. In addition to this, the ink flow path walls formed of this ink flow path wall-forming material are insufficient in terms of their mechanical strength. Therefore, this ink flow path wall-forming material is not practically usable in the production of a desirable ink jet head.

As the curing agent usable in the present invention, any of the conventional curing agents usually used in curing an epoxy resin may be used. These curing agents include amine series curing agents capable of causing curing at room temperature. Specific examples of such amine series curing agents are a commercially available modified aromatic amine series curing agent (trademark name: Fujicure FXK-830, produced by Fujikasei Kogyo Kabushiki Kaisha) and a commercially available modified aliphatic amine series curing agent (trademark name: Epomic Q614, produced by Mitsui Petrochemical Industries, Ltd.).

The resin composition (a) (comprising the hardening epoxy resin (b) in the liquid state at room temperature as a main component and the siloxane bond possessing epoxy resin (c)) used as the ink flow path wall-forming material in the present invention may be of a thermohardening type or a photo-hardening type. The resin composition (a) may be made of a photo-hardening type by incorporating an appropriate photo-curing agent into the resin composition.

As such photo-curing agent, there can be mentioned cationic polymerized compounds which do not suffer from polymerization hindrance due to oxygen, provide a slight cure shrinkage, provide an excellent adhesion and bonding property, and are excellent in heat resistance and resistance to chemicals. A preferred example of such cationic polymerized compound is the commercially available Adeka Optomer SP-170 (trademark name, produced by Asahi Denka Kogyo Kabushiki Kaisha).

The resin composition (a) as the ink flow path wall-forming material is desired to contain a silane coupling agent. The resin composition (a) containing a silane coupling agent provides improved adhesion and reduced thixotropic property and is free of the problem of taking in air bubble upon application onto a substrate. In addition, it exhibits a reduced viscosity. However, the silane coupling agent is compatible with a positive type photoresist, and because of this, an excessive amount of the silane coupling agent should not be incorporated into the resin composition (a). In addition to this, there is a tendency for the composition (a) to have decreased ink resistance as the amount of the silane coupling agent to be incorporated into the resin composition (a) is increased. In view of this, it is desired for the amount of the silane coupling agent to be incorporated into the resin composition (a) to be in the range of 1 to 10 parts by weight versus the amount of the resin composition (a).

As the silane coupling agent, it is desired to use epoxy series silane coupling agents, from the viewpoint of their compatibility with the resin composition (a). In the case where the resin composition (a) contains an amine series thermohardening agent, it is desired to use an amine series silane coupling agent.

In the following, description will be made of the process of producing an ink jet head according to the present invention.

FIGS. 2(a)-1 through 2(j)-2 are schematic views for explaining a process for producing an ink jet head according to the present invention.

FIGS. 2(a)-1, 2(b)-1, 2(c)-1, 2(d)-1, 2(e)-1, 2(f)-1, 2(g)-1, 2(h)-1, 2(i)-1, and 2(j)-1 are schematic views of products obtained in the respective steps of the production of an ink jet head when viewed from the discharging outlet side.

2(a)-2, 2(b)-2, 2(c)-2, 2(d)-2, 2(e)-2, 2(f)-2, 2(g)-2, 2(h)-2, 2(i)-2, and 2(j)-2 are schematic slant views of the respective products shown in FIGS. 2(a) through 2(j).

In this production example, there is described an ink jet head having three orifices. This is only for simplification purposes. It is a matter of course that the number of the orifices may be properly changed depending upon the kind of an ink jet head to be produced.

In each figure, reference numeral 1 indicates a base member made of a material selected from the group consisting of silicon wafer, metals, glass, ceramics, and plastics.

Figure 1A:
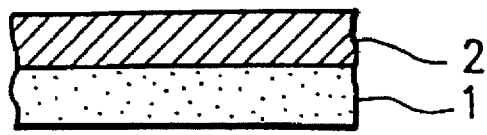
FIGS. 1(a), 1(b), 1(c), 1(d), 1(e) and 1(f) are schematic views for explaining the process of producing a conventional ink jet head.
Figure 1B:
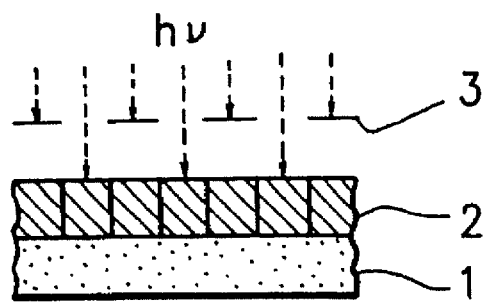
Figure 1C:
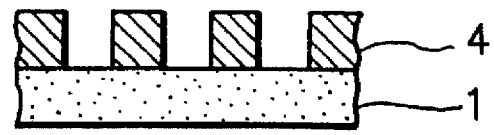
Figure 1D:
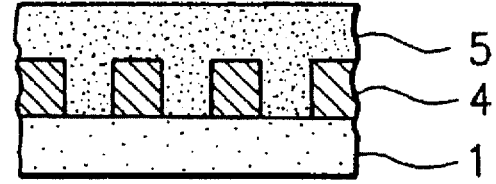
Figure 1E:
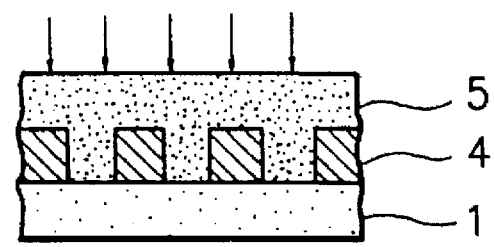
Figure 1F:
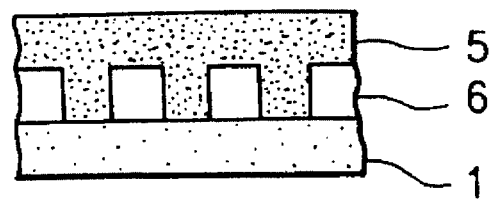
Figures 2, 2A:
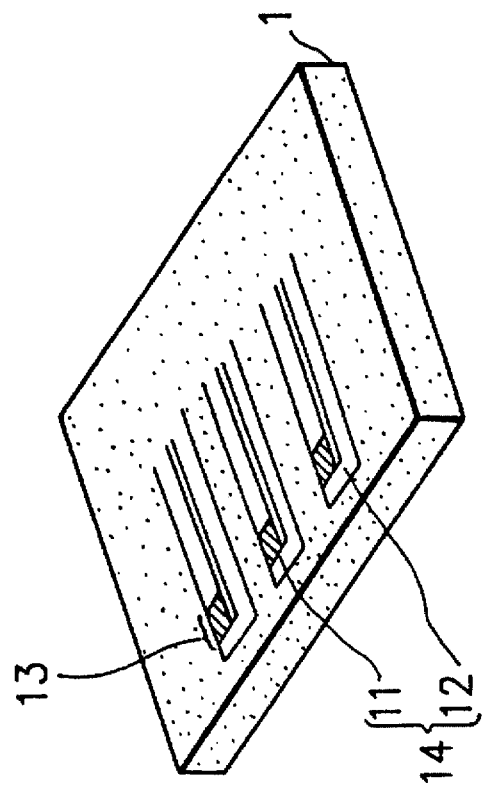
FIGS. 2(a)-1, 2(a)-2, 2(b)-1, 2(b)-2, 2(c)-1, 2(c)-2, 2(d)-1, 2(d)-2, 2(e)-1, 2(e)-2, 2(f)-1, 2(f)-2, 2(g)-1, 2(g)-2, 2(h)-1.
Figures 1, 2A:
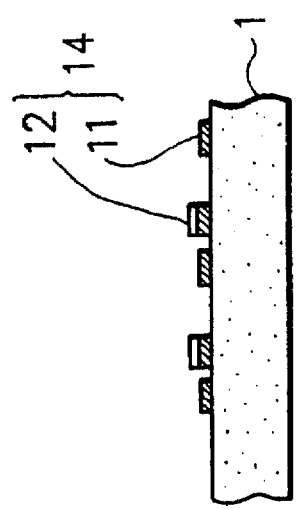

Now, on the base member 1, there are disposed a desired number of energy generating elements for generating energy for discharging printing liquid (this energy generating element will be hereinafter referred to as liquid discharging energy generating element) such as an electrothermal converting element or piezoelectric element. In FIGS. 2(a)-1 and 2(a')-2, reference number 14 indicates an electrothermal converting element disposed on the base member 1. The electrothermal converting element 14 may be formed by a conventional thin film-forming technique employed in the semiconductor field. Particularly, the formation of the electrothermal converting element may be conducted, for example, in the following manner. That is, a heat generating resistor layer 11 comprised of, for example, $HfB_2$, TaN, or $Ta_2O_5$ is formed on the base member 1 by means of the sputtering or CVD process, followed by forming an electrode layer 12 comprised of, for example, Al on the heat generating resistor layer 11 by means of the sputtering, CVD or evaporation process. Thereafter, only the electrode layer 12 is patterned into such an electrode pattern as shown in FIG. 2(a')-2 by means of a photolithography technique.

Then, the heat generating resistor layer 11 is patterned into such a pattern as shown in FIG. 2(a')-2 by means of a photolithography technique. By this, the formation of the electrothermal converting element 14 is completed. Herein, an exposed portion of the heat generating resistor layer 11 which is not covered by the electrode layer 12 corresponds to an exothermic portion (a heat generating portion) 13.

The liquid discharging energy generating element serves to generate energy for discharging ink droplets thereby performing printing. In the case where the electrothermal converting element is used as the liquid discharging energy generating element, the electrothermal converting element serves to heat ink present in the vicinity thereof to cause a state change of volume expansion for the ink, resulting in discharging ink. On the other hand, in the case where the piezoelectric element is used as the liquid discharging energy generating element, ink discharging is conducted by virtue of a mechanical vibration caused by the piezoelectric element. In any case, wiring is electrically connected to each of these discharging energy generating elements (not shown in the figures). As for any of these discharging energy generating elements, in order to improve their durability, various functional layers including a protective layer are usually disposed thereon. In the present invention, these functional layers may be disposed.

Figures 2, 2B:
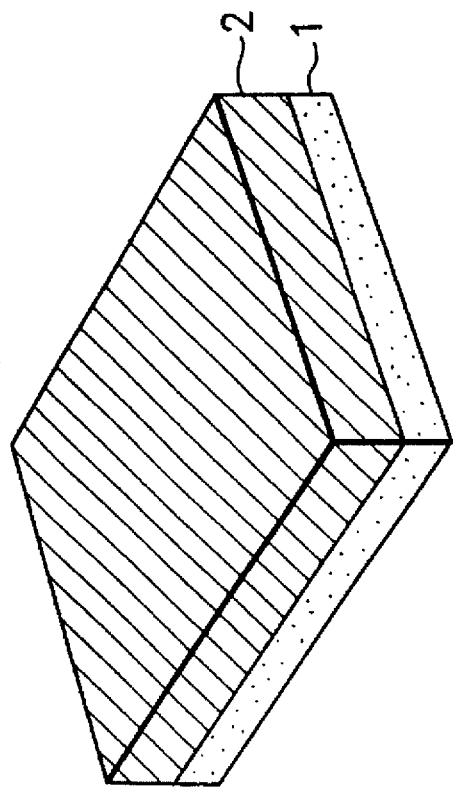
Figures 1, 2B:
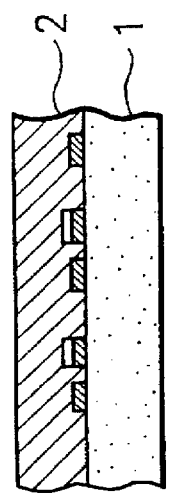

After the foregoing step (see, FIGS. 2(a)-1 and 2(a')-2, a photosensitive resin layer 2 comprised of a positive type photoresist is disposed on the base member 1 so as to cover the liquid discharging energy generating elements disposed on the base member 1 (see, FIGS. 2(b) and 2(b')-2. This step shown in FIGS. 2(b)-1 and 2(b')-2, will be hereinafter referred to as the second step.

In a preferred embodiment, the photosensitive resin layer 2 is formed of a positive type photoresist capable of being resolved and removed in a later treatment. Specific examples of such photoresist are naphthoquinone series positive type photoresists, positive type photoresists of the chemical amplification type, and positive type photoresists of the backbone chain decomposition type.

The formation of the photosensitive resin layer 2 may be conducted by means of a spin coating or roll coating technique. Other than this, it may be conducted by a method of providing a dry film of any of the foregoing positive type photoresist and laminating the dry film on the base member 1.

Figures 2, 2C:
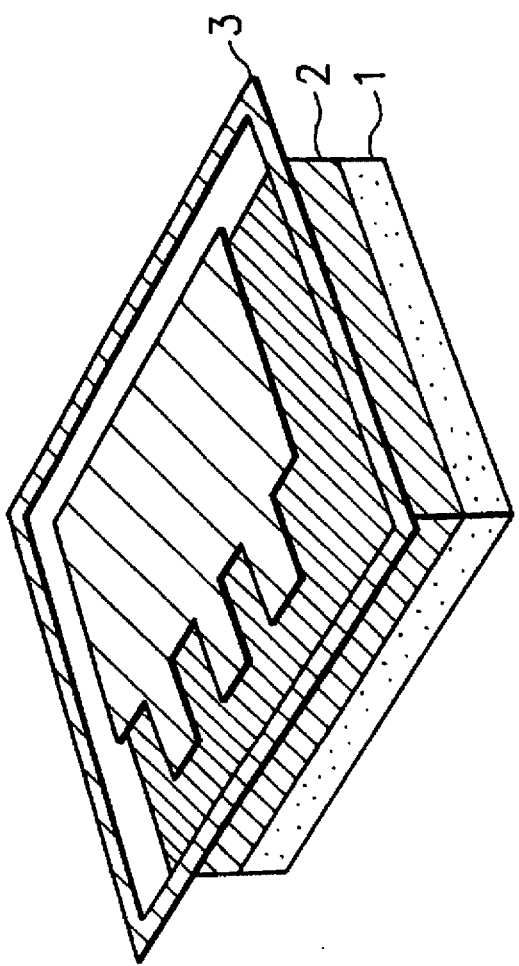
Figures 1, 2C:
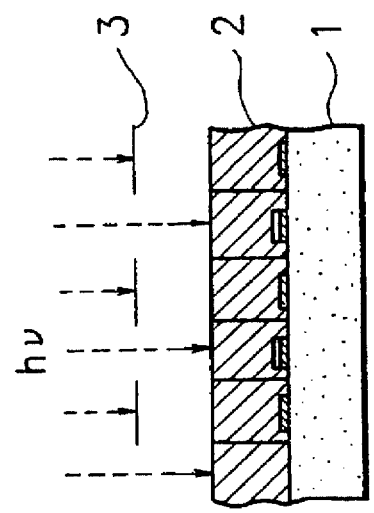

In a third step (see, FIGS. 2(c)-1 and 2(c')-2, the photosensitive resin layer side of the stacked body obtained in the second step is subjected to light exposure through a patterning mask is for forming ink pathway-forming portions.

Figures 2, 2D:
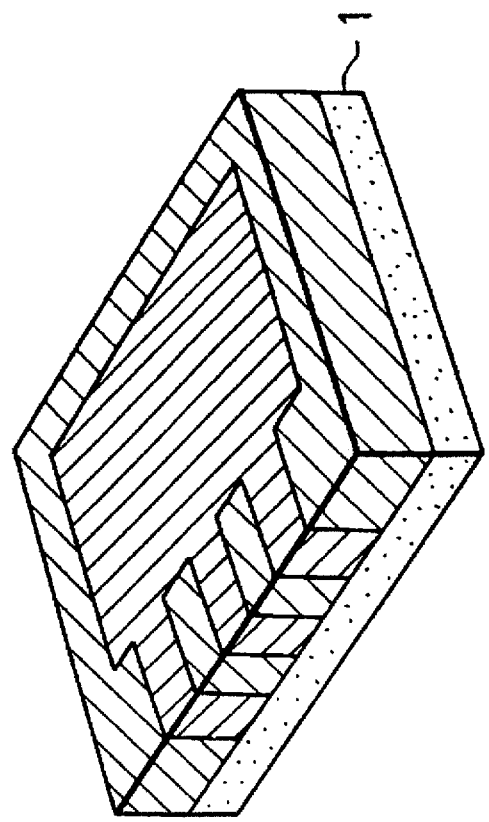
Figures 1, 2D:
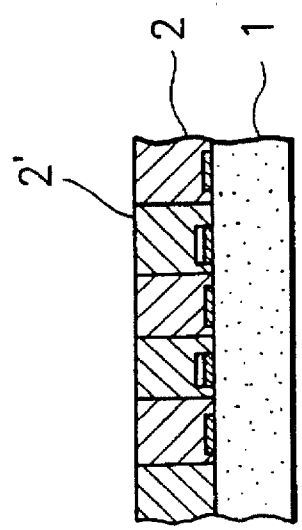

FIGS. 2(d)-1 and 2(d)-2 are schematic views illustrating the resultant obtained in this step in which portions 2' of the photosensitive resin layer 2 have been solubilized as a result of the light exposure.

Figures 2, 2E:
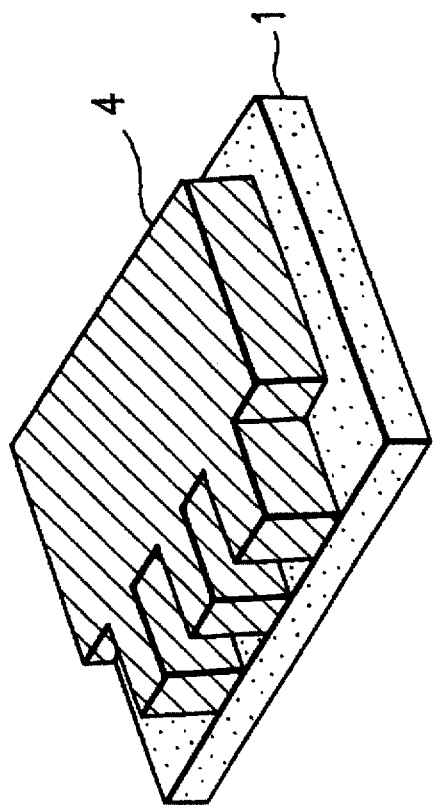
Figures 1, 2E:
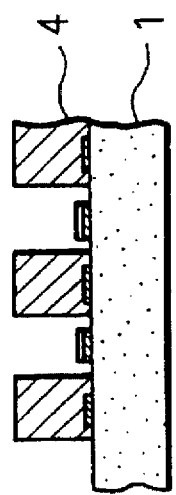

In a fourth step (see, FIGS. 2(e)-1 and 2(e')-2, the light-exposed portions 2' of the photosensitive resin layer 2 are subjected to development with an appropriate solvent such an alkali solution, thereby forming a solid layer 4 (that is, a resist pattern) which serves to form ink pathways.

The shapes of the ink pathways may be properly designed as desired by using, as the patterning mask 3, a patterning mask having a desired pattern capable of contributing to the formation such ink pathways. In this case, the resulting solid layer eventually acquires a pattern capable of providing such ink pathways having a desired shape.

In this embodiment, as is apparent from the figures, there are described three liquid discharging energy generating elements. Therefore, three ink discharging outlets are disposed to correspond to the respective liquid discharging energy generating elements so that an ink droplet can be discharged from each of the ink discharging outlets. Further, there are described three ink pathways each corresponding to one of the three ink discharging outlets. The three ink pathways communicate with a common ink chamber such that ink can be supplied from the common ink chamber to each of the three ink pathways.

Figures 2, 2F:
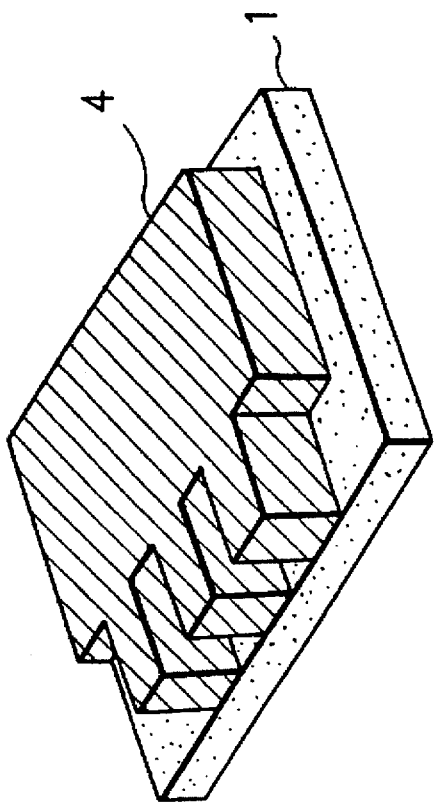
Figures 1, 2F:
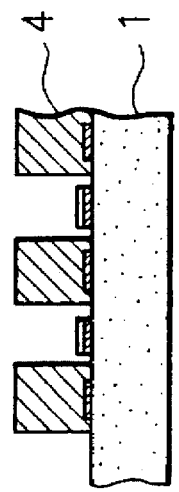

Now, in a fifth step (see, FIGS. 2(f)-1 and 2(f')-2, in order to solubilize the solid layer 4, the entire solid layer is subjected to light exposure.

The positive type resist constituting the solid layer is liable to produce nitrogen gas when it is reacted with light irradiated. Therefore, when an ink flow path wall-forming material 5 (see, FIGS. 2(g)-1 and 2(g')-2 is disposed to cover the solid layer 4 without conducting any treatment for the solid layer, a problem will sometimes occur in that gas is taken into the ink flow path wall-forming material to result in deforming the shapes of ink pathways to be formed. In order to prevent occurrence of this problem, after the entire solid layer has been subjected to light exposure, it is desired for the solid layer to be subjected to deaeration treatment. In the case where a photo-curing material is used as the ink flow path wall-forming material 5, nitrogen gas will be produced sometimes from the solid layer 4 also upon subjecting the ink flow path wall-forming material 5 to light exposure. Therefore, it is desired to make the solid layer 4 sufficiently reacted by alternately repeating a step of subjecting the entire solid layer to light exposure and a step of subjecting the solid layer to deaeration treatment.

Figures 2, 2G:
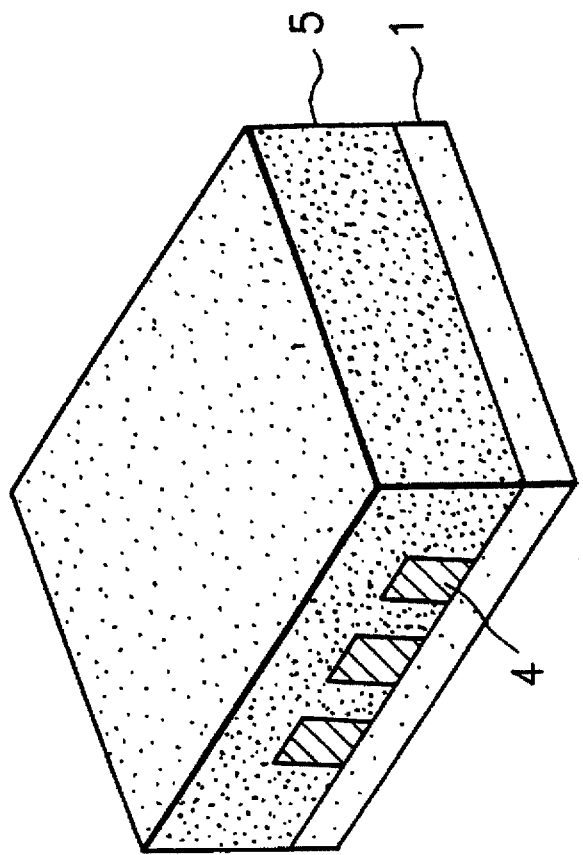
Figures 1, 2G:
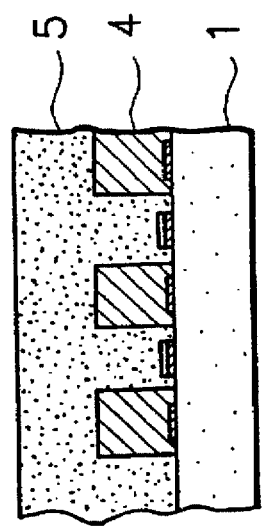
Figures 2, 2H:
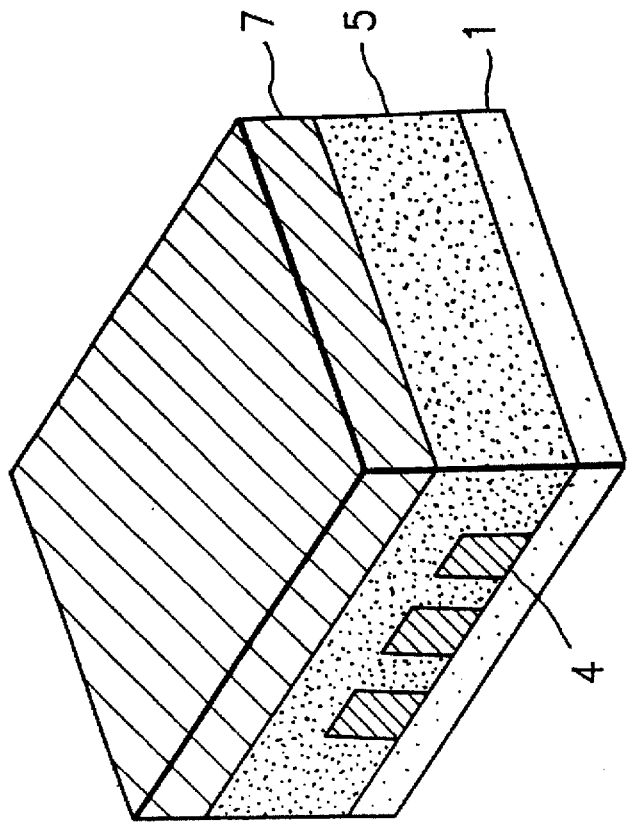
Figures 1, 2H:
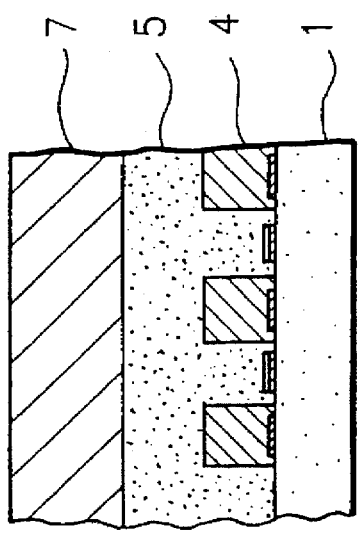

In a sixth step (see, FIGS. 2(g)-1 and 2(g')-2, a hardening epoxy resin composition comprising a hardening epoxy resin in the liquid state at room temperature as a main component and an epoxy resin with a diepoxide structure having a siloxane bond (that is, the foregoing resin composition (a)) as the ink flow path wall-forming material 5 is applied onto the base member 1 so as to entirely cover the solid layer 4 formed on the base member by means of a dispenser or the like.

Herein, after the application of the ink flow path wall-forming material 5, it is possible to join a top plate 7 to the applied ink flow path wall-forming material 5. (see, FIGS. 2(h)-1 and 2(h')-2.

Figures 1, 2I:
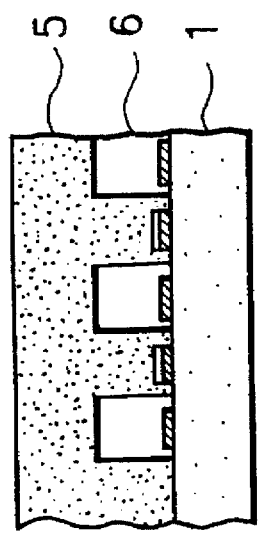
Figures 2, 2I:
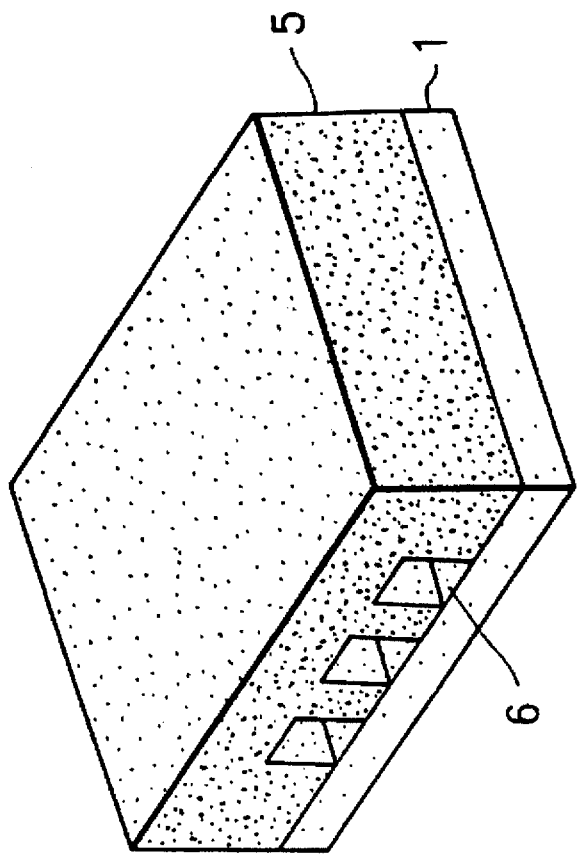
Figures 2, 2J:
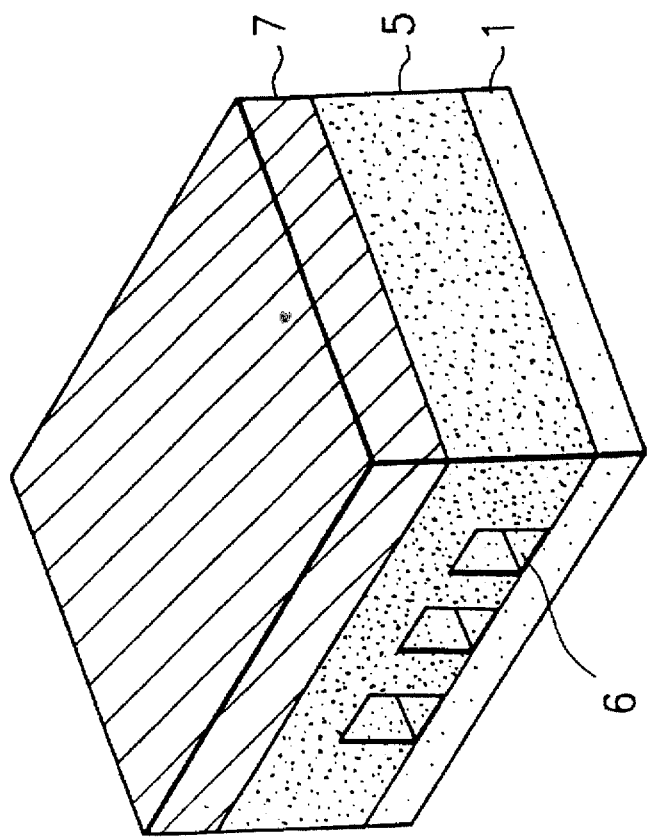
Figures 1, 2J:
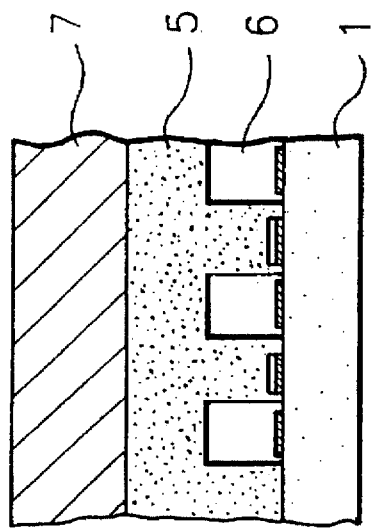

In a seventh step (see, FIGS. 2(i)-1, 2(i')-2, 2(j)-1 and 2(j')-2, the ink flow path wall-forming material 5 is subjected to heat treatment or light exposure treatment to harden the ink flow path forming material. Thereafter, the solid layer 4 is dissolved and removed using an organic solvent such as halogen-containing hydrocarbon, ketone, ester, or alcohol or an aqueous alkaline solution of sodium hydroxide or potassium hydroxide to thereby form ink pathways and a common ink chamber in communication with any of these ink pathways. Thus, the production of an ink jet head is completed.

In the following, an example of an ink jet apparatus in which an ink jet head according to the present invention can be installed will be described.

FIG. 5 is a perspective view illustrating an example of an ink jet apparatus (IJA) in which an ink jet head according to the present invention is installed as an ink jet head cartridge (IJC). In FIG. 5, reference numeral 20 indicates an ink jet head cartridge (IJC) provided with nozzle groups capable of discharging ink to the printing face of a printing sheet transported on a platen 24. Reference number 16 indicates a carriage (HC) which serves to hold the IJC 20. The carriage HC is connected to a part of a driving belt 18 capable of transmitting a driving force such that it can be slidably moved together with two guide shafts 19A and 19B arranged in parallel with each other. By this, the IJC 20 is allowed to move back and forth along the entire printing sheet.

Reference numeral 26 indicates a head restoring device which is disposed at one end of the moving passage of the IJC 20, specifically, at the position opposite the home position. The head restoring device 26 is operated by virtue of a driving force transmitted through a driving mechanism 23 from a motor 22, thereby capping the IJC 20. In relation to the capping for the IJC 20 by a cap member 26A of the head restoring device 26, the discharge restoration treatment of removing adhesive ink in the nozzles is conducted by ink sucking by means of an appropriate sucking means disposed in the head restoring device 26 or by ink pressure transportation by means of an appropriate pressurizing means, thereby forcibly discharging the ink through the discharge outlets. When printing is terminated, the IJC 20 is protected by capping it.

Reference numeral 30 indicates a cleaning blade comprising a wiping member made of silicon rubber which is arranged at a side face of the head restoring device 26. The cleaning blade 30 is supported by a blade supporting member 30A in a cantilever-like state. As in the case of the head restoring device 26, the cleaning blade 30 is operated by virtue of a driving force transmitted through the driving mechanism 23 from the motor 22, wherein the cleaning blade 30 is made capable of contacting the discharging outlet face of the IJC 20. By this, the cleaning blade 30 is projected into the path of movement of the IJC 20 timely with the printing performance of the IJC 20 or after the discharge restoration treatment using the head restoring device 26 has been completed, to thereby remove water, dust, and the like deposited on the discharging outlet face of the IJC 20.

The present invention provides advantageous effects in an ink jet head or an ink jet apparatus, especially in a system in which printing is conducted by discharging ink by utilizing thermal energy. As for a representative construction and principle of operation, it is desirable to adopt such fundamental principle as disclosed, for example, in U.S. Pat. No. 4,723,129 or U.S. Pat. No. 4,740,796. While this ink jet system can be either the so-called on-demand type or the continuous type, it is particularly effective in the case of the on-demand type because, by applying at least one driving signal for providing a rapid temperature rise exceeding nucleate boiling in response to printing information to an electrothermal converting element disposed for a sheet on which printing liquid (ink) is to be held or for a liquid pathway, the electrothermal converting element generates thermal energy to cause film boiling on a heat acting face of the ink jet head and as a result, a bubble can be formed in the printing liquid (ink) in a one-to-one correspondence with such driving signal.

By way of growth and contraction of the bubble, the printing liquid (ink) is discharged through a discharging outlet to form at least one droplet. It is more desirable to make the driving signal to be of a pulse shape, since in this case, growth and contraction of a bubble take place instantly and because of this, there can be attained particularly excellent responsiveness in the discharging of the printing liquid (ink).

As the driving signal of pulse shape, such driving signal as disclosed in U.S. Pat. No. 4,463,359 or U.S. Pat. No. 4,345,262 is suitable. Additionally, in the case where those conditions disclosed in U.S. Pat. No. 4,313,124, which relates to the invention concerning the rate of temperature rise at the heat acting face, are adopted, further improved printing can be conducted.

As for the construction of the ink jet head, the present invention includes, other than those construction of the discharging outlets, liquid pathways and electrothermal converting elements in combination (linear liquid flow pathway or perpendicular liquid flow pathway) which are disclosed in the above mentioned patent documents, such construction in which a heat acting portion is disposed in a curved region as disclosed in U.S. Pat. No. 4,558,333 or U.S. Pat. No. 4,459,600.

In addition, the present invention may effectively be based on the construction in which a slit common to a plurality of electrothermal converting elements is used as a discharging portion of the electrothermal converting elements, which is disclosed in Japanese Unexamined Patent Publication No. 123670/1984 or another construction in which an opening for absorbing a pressure wave of thermal energy corresponds to a discharging portion, which is disclosed in Japanese Unexamined Patent Publication No. 138461/1984.

Further, the present invention is effective in a full-line type ink jet head having a length corresponding to the maximum width of a printing medium on which printing can be performed. This full-line type ink jet head may be of such construction in which those ink jet heads disclosed in the above-mentioned patent documents are combined or such construction in which they are integrated into a full-line head.

The present invention is effective also in an ink jet head of the exchangeable chip type wherein electric connection to an apparatus body or supply of ink from the apparatus body is enabled when it is mounted on the apparatus body or in the case of another ink jet head of the cartridge type wherein an ink tank is integrally disposed on the ink jet head itself.

Further, it is desirable to add appropriate preparatory auxiliary means to an ink jet apparatus according to the present invention in view of further stabilizing the ink jet apparatus. Particularly, to employ preliminary heating means including an electrothermal converting element or a separate heating element or a combination of these and to employ a preparatory discharging mode in which discharging is conducted separately from printing are also effective in order to achieve stable printing.

Further, the present invention is extremely effective not only in an ink jet apparatus which has, as the printing mode, a printing mode of a main color such as black but also in an ink jet apparatus which includes a plurality of different colors or at least one of full-colors by color mixture, in which a ink jet head is integrally constituted or a plurality of ink jet heads are combined.

In the above-described embodiments of the present invention, explanation has been made with the use of liquid ink. But in the present invention, it is possible to use ink that is in the solid state at room temperature or other ink which becomes softened at room temperature. In the foregoing ink jet apparatus, it is usual to adjust the temperature of the ink itself to be in the range of 30° C. to 70° C. such that the viscosity of the ink lies in the range capable of being stably discharged. In view of this, any ink can be used as long as it is in the liquid state upon the application of a printing signal. It is also possible to use those inks having a property of being liquefied, for the first time, with thermal energy, such that such ink can be liquefied and discharged in the liquid state upon the application of thermal energy depending upon a printing signal or other ink that can start its solidification beforehand at the time of its arrival at a printing member in order to prevent the temperature of the ink jet head from rising due to thermal energy purposely used as the energy for a state change of ink from a solid state to a liquid state or in order to prevent ink from being vaporized by solidifying the ink in a state of being allowed to stand. In the case of using these inks, they can be used in such a manner as disclosed in Japanese Unexamined Patent Publication No. 56847/1985 or Japanese Unexamined Patent Publication No. 71260/1985 in which ink is maintained in concave portions or penetrations of a porous sheet in the liquid state or in the solid state and the porous sheet is arranged to provide a configuration opposite the electrothermal converting element.

In the present invention, it is most effective to conduct the foregoing film boiling method for each of the above described inks.

EXPERIMENTS

In the following, experiments which were conducted by the present inventors in order to accomplish the present invention are described.

In view of the problems found in the conventional ink jet head in that the ink flow path walls are liable to debond from the substrate when the ink jet head is continuously operated over a long period of time using a highly alkaline ink, the present inventors conducted experimental studies in order to find a desirable ink flow path wall-forming material having a desired elasticity modulus and an excellent ink resistance. Particularly, as for the foregoing epoxy resin composition (a) comprising (b) a hardening epoxy resin in the liquid state at room temperature as a main component and (c) a siloxane bond possessing epoxy resin (that is, an epoxy resin with a diepoxide structure having a siloxane bond) which has the advantages of the hardening epoxy resin and a desired elasticity modulus and which exhibits an excellent ink resistance which was developed by the present inventors, experimental studies were conducted as to whether or not the epoxy resin composition (a) is effectively usable as an ink flow path wall-forming material so that the problems in the conventional ink jet head can be solved through the Experiments 1 to 22 described below. In each of the following Experiments 1 to 22, an ink flow path wall-forming material was prepared and the resultant ink flow path wall-forming material was evaluated with respect to ink resistance and elasticity modulus in order to examine whether or not it is effective in forming desirable ink flow path walls which are free of the above problems.

Experiment 1

As the hardening epoxy resin (b) in the liquid state at room temperature, there was provided bisphenol A type epoxy resin (trademark name: Epikote 828, produced by Yuka Shell Kabishiki Kaisha). This bisphenol A type epoxy resin in an amount of 75 parts by weight was mixed well with 25 parts by weight of 1,3-bis(3-glycidoxypropyl) tetramethyldisiloxane as the siloxane bond possessing epoxy resin (c). Thus, there was obtained a main component. 100 parts by weight of the main component was mixed with 50 parts by weight of a modified aromatic amine series curing agent comprising Fujicure FXK-830 (trademark name, produced by Fujikasei Kogyo Kabushiki Kaisha). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample A).

Experiment 2

As the hardening epoxy resin (b) in the liquid state at room temperature, there was provided bisphenol A type epoxy resin (trademark name: Epikote 828, produced by Yuka Shell Kabishiki Kaisha). This bisphenol A type epoxy resin in an amount of 75 parts by weight was mixed well with 25 parts by weight of 1,1,3,3-tetramethyl-1,3-diglycidyletherdisiloxane as the siloxane bond possessing epoxy resin (c). Thus, there was obtained a main component. 100 parts by weight of the main component was mixed with 28 parts by weight of a modified aliphatic amine series curing agent comprising Epomic Q614 (trademark name, produced by Mitsui Petrochemical Industries, Ltd.). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample B).

Experiment 3

As the hardening epoxy resin (b) in the liquid state at room temperature, there was provided bisphenol AD type epoxy resin (trademark name: Epomic R710, produced by Mitsui Petrochemical Industries, Ltd.). This bisphenol AD type epoxy resin in an amount of 90 parts by weight was mixed well with 10 parts by weight of 1,3-bis(3-glycidoxypropyl) tetramethyldisiloxane as the siloxane bond possessing epoxy resin (c). Thus, there was obtained a main component. 100 parts by weight of the main component was mixed with 28 parts by weight of a modified aliphatic amine series curing agent comprising Epomic Q614 (trademark name, produced by Mitsui Petrochemical Industries, Ltd.). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample C).

Experiment 4

As the hardening epoxy resin (b) in the liquid state at room temperature, there was provided bisphenol AD type epoxy resin (trademark name: Epomic R710, produced by Mitsui Petrochemical Industries, Ltd.). This bisphenol AD type epoxy resin in an amount of 90 parts by weight was mixed well with 10 parts by weight of 1,1,3,3-tetramethyl-1,3-diglycidyletherdisiloxane as the siloxane bond possessing epoxy resin (c). Thus, there was obtained a main component. 100 parts by weight of the main component was mixed with 50 parts by weight of a modified aromatic amine series curing agent comprising Fujicure FXK830 (trademark name, produced by Fujikasei Kabushiki Kaisha). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample D).

Experiment 5

The procedures of Experiment 1 were repeated, except that the amount of the bisphenol A type epoxy resin was changed to 95 parts by weight and the amount of the 1,3-bis(3-glycidoxypropyl)tetramethyldisiloxane was changed to 5 parts by weight, to thereby obtain a specimen in the liquid state at room temperature (hereinafter referred to as Sample E).

Experiment 6

The procedures of Experiment 1 were repeated, except that the amount of the bisphenol A type epoxy resin was changed to 85 parts by weight and the amount of the 1,3-bis(3-glycidoxypropyl)tetramethyldisiloxane was changed to 15 parts by weight, to thereby obtain a specimen in the liquid state at room temperature (hereinafter referred to as Sample F).

Experiment 7

The procedures of Experiment 1 were repeated, except that the amount of the bisphenol A type epoxy resin was changed to 65 parts by weight and the amount of the 1,3-bis(3-glycidoxypropyl)tetramethyldisiloxane was changed to 35 parts by weight, to thereby obtain a specimen in the liquid state at room temperature (hereinafter referred to as Sample G).

Experiment 8

The procedures of Experiment 1 were repeated, except that the amount of the bisphenol A type epoxy resin was changed to 60 parts by weight and the amount of the 1,3-bis(3-glycidoxypropyl)tetramethyldisiloxane was changed to 40 parts by weight, to thereby obtain a specimen in the liquid state at room temperature (hereinafter referred to as Sample H).

Experiment 9

The procedures of Experiment 1 were repeated, except that the amount of the bisphenol A type epoxy resin was changed to 50 parts by weight and the amount of the 1,3-bis(3-glycidoxypropyl)tetramethyldisiloxane was changed to 50 parts by weight, to thereby obtain a specimen in the liquid state at room temperature (hereinafter referred to as Sample I).

Experiment 10

As the hardening epoxy resin (b) in the liquid state at room temperature, there was provided bisphenol AD type epoxy resin (trademark name: Epomic R710, produced by Mitsui Petrochemical Industries, Ltd.). This bisphenol AD type epoxy resin in an amount of 95 parts by weight was mixed well with 5 parts by weight of 1,1,3,3-tetramethyl-1,3-diglycidyletherdisiloxane as the siloxane bond possessing epoxy resin (c). Thus, there was obtained a main component. 100 parts by weight of the main component was mixed with 28 parts by weight of a modified aliphatic amine series curing agent comprising Epomic Q614 (trademark name, produced by Mitsui Petrochemical Industries, Ltd.). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample J).

Experiment 11

The procedures of Experiment 10 were repeated, except that the amount of the bisphenol AD type epoxy resin was changed to 90 parts by weight and the amount of the 1,1,3,3-tetramethyl-1,3-diglycidyletherdisiloxane was changed to 10 parts by weight, to thereby obtain a specimen in the liquid state at room temperature (hereinafter referred to as Sample K).

Experiment 12

The procedures of Experiment 10 were repeated, except that the amount of the bisphenol AD type epoxy resin was changed to 60 parts by weight and the amount of the 1,1,3,3-tetramethyl-1,3-diglycidyletherdisiloxane was changed to 40 parts by weight, to thereby obtain a specimen in the liquid state at room temperature (hereinafter referred to as Sample L).

Experiment 13

The procedures of Experiment 1 were repeated, except that the amount of the bisphenol A type epoxy resin was changed to 100 parts by weight, to thereby obtain a specimen in the liquid state at room temperature (hereinafter referred to as Sample M).

Experiment 14

As the hardening epoxy resin (b) in the liquid state at room temperature, there was provided bisphenol A type epoxy resin (trademark name: Epikote 828, produced by Yuka Shell Kabishiki Kaisha). This bisphenol A type epoxy resin in an amount of 75 parts by weight was mixed well with 25 parts by weight of a flexibilizer Epolite 3002 (trademark name, produced by Kyoeiyushi Kabushiki Kaisha). Thus, there was obtained a main component. 100 parts by weight of the main component was mixed with 50 parts by weight of a modified aromatic amine series curing agent comprising Fujicure FXK-830 (trademark name, produced by Fujikasei Kogyo Kabushiki Kaisha). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample N).

Experiment 15

As the hardening epoxy resin (b) in the liquid state at room temperature, there was provided bisphenol A type epoxy resin (trademark name: Epikote 828, produced by Yuka Shell Kabishiki Kaisha). This bisphenol A type epoxy resin in an amount of 75 parts by weight was mixed well with 25 parts by weight of 1,3-bis(3-glycidoxypropyl)tetramethyldisiloxane as the siloxane bond possessing epoxy resin (c). Thus, there was obtained a main component. 100 parts by weight of the main component was mixed with 1.5 parts by weight of a cationic ultraviolet-ray curing initiator Adeka Optomer SP-170 (trademark name, produced by Asahidenka Kogyo Kabushiki Kaisha). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample O).

Experiment 16

As the hardening epoxy resin (b) in the liquid state at room temperature, there was provided bisphenol AD type epoxy resin (trademark name: Epomic R710, produced by Mitsui Petrochemical Industries, Ltd.). This bisphenol AD type epoxy resin in an amount of 80 parts by weight was mixed well with 20 parts by weight of 1,1,3,3-tetramethyl-1,3-diglycidyletherdisiloxane as the siloxane bond possessing epoxy resin (c). Thus, there was obtained a main component. 100 parts by weight of the main component was mixed with 1.5 parts by weight of a cationic ultraviolet-ray curing initiator Adeka Optomer SP-170 (trademark name, produced by Asahidenka Kogyo Kabushiki Kaisha). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample P).

Experiment 17

As the hardening epoxy resin (b) in the liquid state at room temperature, there was provided bisphenol A type epoxy resin (trademark name: Epikote 828, produced by Yuka Shell Kabushki Kaisha). This bisphenol A type epoxy resin in an amount of 95 parts by weight was mixed well with 5 parts by weight of 1,1,3,3-tetramethyl-1,3-diglycidyletherdisiloxane as the siloxane bond possessing epoxy resin (c). Thus, there was obtained a main component. 100 parts by weight of the main component was mixed with 1.5 parts by weight of a cationic ultraviolet-ray curing initiator Adeka Optomer SP-170 (trademark name, produced by Asahidenka Kogyo Kabushiki Kaisha). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample Q).

Experiment 18

As the hardening epoxy resin (b) in the liquid state at room temperature, there was provided bisphenol AD type epoxy resin (trademark name: Epomic R710, produced by Mitsui Petrochemical Industries, Ltd.). This bisphenol AD type epoxy resin in an amount of 90 parts by weight was mixed well with 10 parts by weight of 1,3-bis(3-glycidoxypropyl)tetramethyldisiloxane as the siloxane bond possessing epoxy resin (c). Thus, there was obtained a main component. 100 parts by weight of the main component was mixed with 1.5 parts by weight of a cationic ultraviolet-ray curing initiator Adeka Optomer SP-170 (trademark name, produced by Asahidenka Kogyo Kabushiki Kaisha). Then, to the resultant, 5 parts by weight of an epoxy series silane coupling agent A-187 (trade name, produced by Nippon Unicar Kabushiki Kaisha) was added, and the mixture obtained was homogenized. Thus, there was obtained a specimen in the liquid state at room temperature (hereinafter referred to as Sample R).

Experiment 19

The procedures of Experiment 15 were repeated, except that the amount of the bisphenol A type epoxy resin was changed to 60 parts by weight and the amount of the 1,3-bis(3-glycidoxypropyl)tetramethyldisiloxane was changed to 40 parts by weight, to thereby obtain a specimen in the liquid state at room temperature (hereinafter referred to as Sample S).

Experiment 20

The procedures of Experiment 16 were repeated, except that the amount of the bisphenol AD type epoxy resin was changed to 50 parts by weight and the amount of the 1,1,3,3-tetramethyl-1,3-diglycidyletherdisiloxane was changed to 50 parts by weight, to thereby obtain a specimen in the liquid state at room temperature (hereinafter referred to as Sample T).

Experiment 21

The procedures of Experiment 15 were repeated, except that the amount of the bisphenol A type epoxy resin was changed to 100 parts by weight, to thereby obtain a specimen in the liquid state at room temperature (hereinafter referred to as Sample U).

Experiment 22

The procedures of Experiment 14 were repeated, except that the modified aromatic amine series curing agent comprising Fujicure FXK-830 was replaced by a cationic ultraviolet-ray curing initiator Adeka Optomer SP-170 (trademark name, produced by Asahidenka Kogyo Kabushiki Kaisha) and 1.5 parts by weight of this cationic ultraviolet-ray curing initiator was mixed with 100 parts of the main component, to thereby obtain a specimen in the liquid state at room temperature (hereinafter referred to as Sample V).

As for each of Samples A to V obtained in Experiments 1 to 22, evaluation was conducted with respect to adhesion (or bonding property) and form retention in order to examine its ink resistance and elasticity modulus which are required for it being usable as an ink flow path wall-forming material capable of forming high quality ink flow path walls.

The evaluation of each evaluation item was conducted in the following manner.

Evaluation of adhesion (bonding property):

Each of Samples A to V was evaluated with respect to ink resistance, adhesion (bonding property) and elasticity modulus in the following manner.

That is, as for each sample, there were provided two glass plates as a substrate. And on the surface of each substrate, a 100 μm thick coat was formed by applying a specimen of each sample. Then, as for each of Samples A to N, preparatory hardening was conducted at room temperature, followed by conducting thermal hardening (thermosetting) at 130° C. for 2 hours. As for each of Samples O to V, irradiation of ultraviolet rays of 8.3J was firstly conducted, followed by conducting thermal hardening (thermosetting) at 130° C. for an hour.

The two substrates each having a hardened film thereon as for each of Samples A to V were treated as follows.

(i) One substrate was immersed in the ordinary ink (comprising 36 wt. % of DEG and 74 wt. % of water), wherein it was allowed to stand under conditions of 120° C. and 2 atmospheric pressure for 10 hours. Thereafter, the substrate was taken out from the ink, and it was washed with water, followed by drying.

(ii) The other substrate was immersed in highly alkaline ink of pH 10.7 (comprising 10.0 wt. % of GLY, 5.0 wt. % of urea, 5.0 wt. % of IPA, 0.4 wt. % of lithium hydroxide, 0.5 wt. % of ammonium sulfate, and 79.9 wt. % of water), wherein it was allowed to stand under conditions of 120° C. and 2 atmospheric pressure for 10 hours. Thereafter, the substrate was taken out from the ink, and it was washed with water, followed by drying.

Each of the two resultants obtained in the above treatments (i) and (ii) was examined whether or not a debonding was present at the hardened film on the substrate by means of a microscope.

The examined results obtained are collectively shown in Table 1 based on the following criteria.

◯: no debonding was found at the hardened film; and
X: apparent debonding was found at the hardened film.

Now, it is considered that when the hardened film on the substrate is not satisfactory in terms of either the ink resistance or elasticity modulus, debonding is caused at the hardened film. Therefore, it can be said that the hardened film on the substrate accompanied by no debonding is satisfactory in terms of both ink resistance and elasticity modulus.

Evaluation of form retention:

In the above evaluation of adhesion (bonding property), it is possible to distinguish a hardened film which is excessively high in elasticity modulus, but a hardened film which is excessively low in elasticity modulus, cannot be distinguished. As for such hardened film which is excessively low in elasticity modulus, when it is used in forming an ink pathway, the ink pathway formed is liable to deform when it is subjected to external pressure, because it is insufficient in terms of its mechanical strength. In view of this, as for each of Samples A to V, evaluation was conducted with respect to form retention. This evaluation was conducted by way of the bending elasticity modulus test in the following manner.

In accordance with the test method of JIS-K-6911, a specimen of each of Samples A to V was cast in a mold, followed by hardening. As for each of Samples A to N, hardening was conducted in the following manner. Preparatory hardening was conducted at room temperature, followed by conducting thermal hardening (thermosetting) at 130° C. for 2 hours. As for each of Samples O to V, hardening was conducted in the following manner. Irradiation of ultraviolet rays of 8.3J was firstly conducted, followed by conducting thermal hardening (thermosetting) at 130° C. for an hour.

Thus, there was obtained a molded product (hereinafter referred to as solid sample) for each of Samples A to V. Each solid sample thus obtained was examined on a commercially available bending modulus elasticity measuring instrument RTM-100 (trademark name, produced by Toyo Baldwin Kabushiki Kaisha) to examine its bending elasticity modulus. The results obtained are collectively shown in Table 1 based on the following criteria.

◯: the solid sample was 60 kgf/mm$^2$ or more in bending elasticity modulus; and
X: the solid sample was less than 60 kgf/mm$^2$ in bending elasticity modulus.

Herein, form retention means the mechanical strength of a material when it is used as a constituent of an ink jet head. When the material is less than 60 kgf/mm$^2$ in bending elasticity modulus, it can be said that the material is insufficient in terms of its mechanical strength and therefore, when ink flow path walls are formed using this material, the ink flow path walls are poor in form retention, and they are liable suffer damage.

In addition, evaluation was conducted with respect to adhesion (bonding property) and form retention. The results obtained are collectively shown in Table 1 based on the following criteria.

◯: both the evaluated result with respect to adhesion (bonding property) and the evaluated result with respect to form retention are excellent; and
X: either the evaluated result with respect to adhesion (bonding property) or the evaluated result with respect to form retention is inferior.

Total Evaluation

From the evaluated results with respect to adhesion (bonding property), there were obtained the following findings. That is, the hardened film formed of any of Samples E, J, M, Q and U obtained in Experiments 5, 10, 13, 17 and 21 causes debonding when immersed in the ordinary ink and in the highly alkaline ink wherein peels off of the substrate. As for the hardened film formed of any of Samples N and V obtained in Experiments 14 and 22, although it does not causes debonding when immersed in the ordinary ink, when it is immersed in the highly alkaline ink, it causes debonding wherein it peels off of the substrate. As for the hardened film formed of Sample F, it is substantially free from occurrence of debonding when immersed in the ordinary ink and also in the highly alkaline ink, but when immersed in the highly alkaline ink, a slight removal occurs between the hardened film and the substrate. As for the hardened film formed of each of the remaining samples, no debonding occurs when immersed in the ordinary ink and also in the highly alkaline ink.

From the evaluated results with respect to form retention, there were obtained the following findings. The molded product obtained from each of Samples I and T obtained in Experiments 9 and 20 is less than 60 kgf/mm$^2$ in bending elasticity modulus and thus, it is inferior in mechanical strength.

Based on the above findings, as for the hardened film formed of each of Samples E, J, M, Q and U obtained in Experiments 5, 10, 13, 17 and 21, the reason why the hardened film causes debonding when immersed in the ordinary ink and also in the highly alkaline ink is considered due to the fact that because the main component is relatively high in elasticity modulus, specifically, the content of the hardening epoxy resin (b) in the main component is relatively high, shrinkage stress generated upon hardening cannot be sufficiently absorbed, which results in debonding wherein the hardened film peels off of the substrate. Similarly, as for the hardened film formed of each of Samples N and V obtained in Experiments 14 and 22, the reason why the hardened film causes debonding when immersed in the highly alkaline ink is considered due to the fact that the flexibilizer is decomposed with the action of the highly alkaline ink, and reduce the ink resistance of the hardened film, thus causing such debonding wherein the hardened film peels off of the substrate.

As for the reason why the molded product formed from each of Samples I and T obtained in Experiments 9 and 20 is inferior in mechanical strength, it is considered due to the fact that the content of the hardening epoxy resin (b) in the main component is relatively small and this makes the molded product inferior in mechanical strength. In addition, each of Samples I and T obtained in Experiments 9 and 20 takes a remarkably longer period of time for hardening in comparison with the hardening time in the case of each of the other samples. Therefore, there cannot be attained a desired yield in the production of an ink jet head by using either of Samples I and T.

Separately, as for Sample O obtained in Experiment 15 (composed of 25 parts by weight of bisphenol A type epoxy resin, 25 parts by weight of 1,3-bis(3-glicidoxypropyl) tetramethydisiloxane, and 1.5 parts by weight of a cationic ultraviolet-ray curing initiator) and Sample V obtained in Experiment 22 (composed of 25 parts by weight of bisphenol A type epoxy resin, 25 parts by weight of the conventional flexibilizer (Epolite 3002), and 1.5 parts by weight of a cationic ultraviolet-ray curing initiator), their viscosity was measured. As a result, the viscosity of the former sample was found to be 340 cps and that of the latter sample was found to be 4500 cps. From these results, it is understood that the former sample is of a remarkably low viscosity corresponding to a value of about 1/13 of the viscosity of the latter sample (in which the conventional flexibilizer was used) and that the former sample is free of a problem of causing taken-in of air bubbles upon application onto a substrate but the latter sample is not free of such problem.

From the above description, it is understood that any of Samples A, B, C, D, F, G, H, K, L, O, P, R, and S (each comprising the foregoing resin composition (a) as the main component, said resin composition comprising the hardening epoxy resin (b) in the liquid state at room temperature and the diepoxide structure possessing epoxy resin (c)) obtained in Experiments 1–4, 6–8, 11–12, 15–16, and 18–19 belonging to the present invention is desirably usable as an ink flow path wall-forming material which enables formation of high quality ink flow path walls free from occurrence of debonding even when a highly alkaline ink, resulting in making it possible to efficiently produce a high quality ink jet head which ensures stable ink discharging. Of these samples belonging to the present invention, Samples A, B, O and P obtained in Experiments 1, 2, 15 and 16 are overall most desirable.

The present invention will be described in more detail by reference to the following examples, which are provided here for illustrative purposes only and are not intended to limit the scope of the present invention.

In the following, there will be described an example in which Sample A obtained in Experiment 1 is used and an example in which Sample P obtained in Example 16 is used. There will be also described a comparative example in which Sample M obtained in Example 13 is used and a comparative example in which Sample N obtained in Experiment 14 is used.

Example 1

There was provided a silicon wafer as a base member. On the surface of the base member, a 2000Å thick HfB$_2$ layer as a heat generating resistor layer was formed by means of the sputtering process, followed by forming, on the heat generating resistor layer, a 1 μm thick aluminum layer as an electrode layer by means of the electron beam evaporation process. The base member having the heat generating resistor layer and electrode layer formed thereon was subjected to patterning by means of the photolithography technique to form a plurality of electrothermal converting elements at 360 dpi corresponding to 128 nozzles. Then, onto the base member, a positive type photoresist PMER AR-900 (trademark name, produced by Tokyo Ohkakogyo Kabushiki Kaisha) was applied in an amount to provide a thickness of 30 μm when dried so as to entirely cover the electrothermal converting elements on the base member by means of the spin coating process, followed by conducting a baking treatment at 90° C. for 40 minutes in an oven, thereby forming a resist layer. Successively, the resultant was subjected to light exposure using a nozzle patterning mask, followed by subjecting it to development and then to rinsing, thereby forming a patterned solid layer having a nozzle pattern with a pitch of 40 μm. The resin composition comprising Sample A obtained in Experiment 1 was applied onto the base member so as to entirely cover the solid layer, followed by subjecting it to a preliminary hardening treatment at 25° C. for 24 hours and then to thermal hardening treatment (thermosetting treatment) at 100° C. for 2 hours. The resultant was immersed in an aqueous solution of sodium hydroxide with a 3 wt. % content, wherein the solid layer having the nozzle pattern was removed. Thus, an ink jet head was obtained. In this way, there were prepared a plurality of ink jet heads.

Each of the resultant ink jet heads was subjected to a continuous printing test, wherein printing was continuously conducted for 1000 hours using highly alkaline ink of pH 10.7 (composed of 10.0 wt. % of GLY, 5.0 wt. % of urea, 5.0 wt. % of IPA, 0.4 wt. % of lithium hydroxide, 0.5 wt. % of ammonium sulfate, and 79.9 wt. % of water).

As a result, each of the ink jet heads was found to conduct desirable printing stably and continuously over the period of 1000 hours without causing any defective ink discharge or any defective print. As for each ink jet head having been subjected to the continuous printing test, observation was conducted of its portions in the vicinity of the discharging outlets. As a result, it was found that the interface between the base member (that is, the substrate for an ink jet head) and the ink flow path walls is maintained in a desirably bonded state with no removal as shown in FIG. 3(a).

Example 2

There was provided a silicon wafer as a base member. On the surface of the base member, a 2000Å thick $HfB_2$ layer as a heat generating resistor layer was formed by means of the sputtering process, followed by forming on the heat generating resistor layer, a 1 μm thick aluminum layer as an electrode layer by means of the electron beam evaporation process. The base member having the heat generating resistor layer and electrode layer formed thereon was subjected to patterning by means of the photolithography technique to form a plurality of electrothermal converting elements at 360 dpi corresponding to 128 nozzles. Then, onto the base member, a positive type photoresist PMER AR-900 (trademark name, produced by Tokyo Ohkakogyo Kabushiki Kaisha) was applied in an amount to provide a thickness of 30 μm when dried so as to entirely cover the electrothermal converting elements on the base member by means of the spin coating process, followed by conducting a baking treatment at 90° C. for 40 minutes in an oven, thereby forming a resist layer. Successively, the resultant was subjected to light exposure using a nozzle patterning mask, followed by subjecting it to development and then to rinsing, thereby forming a patterned solid layer having a nozzle pattern with a pitch of 40 μm. The resin composition comprising Sample P obtained in Experiment 16 was applied onto the base member so as to entirely cover the solid layer, followed by subjecting it to irradiation with ultraviolet rays of 8.3J and then to a thermal hardening treatment (thermosetting treatment) at 130° C. for an hour. The resultant was immersed in an aqueous solution of sodium hydroxide with a 3 wt. % content, wherein the solid layer having the nozzle pattern was removed. Thus, an ink jet head was obtained. In this way, there were prepared a plurality of ink jet heads.

Each of the resultant ink jet heads was subjected to a continuous printing test, wherein printing was continuously conducted for 1000 hours using highly alkaline ink of pH 10.7 (composed of 10.0 wt. % of GLY, 5.0 wt. % of urea, 5.0 wt. % of IPA, 0.4 wt. % of lithium hydroxide, 0.5 wt. % of ammonium sulfate, and 79.9 wt. % of water).

As a result, each of the ink jet heads was found to conduct desirable printing stably and continuously over the period of 1000 hours without causing any defective ink discharge or any defective print. As for each ink jet head having been subjected to the continuous printing test, observation was conducted of its portions in the vicinity of the discharging outlets. As a result, it was found that the interface between the base member (that is, the substrate for an ink jet head) and the ink flow path walls is maintained in a desirably bonded state with no removal as shown in FIG. 3(a).

Comparative Example 1

The procedures of Example 1 were repeated, except that Sample M obtained in Experiment 13 was used as the ink flow path wall-forming material for an ink jet head, to thereby obtain a plurality of comparative ink jet heads.

Each of the resultant comparative ink jet heads was subjected to a continuous printing test, wherein printing was continuously conducted for 1000 hours using highly alkaline ink of pH 10.7 (composed of 10.0 wt. % of GLY, 5.0 wt. % of urea, 5.0 wt. % of IPA, 0.4 wt. % of lithium hydroxide, 0.5 wt. % of ammonium sulfate, and 79.9 wt. % of water).

As a result, each of the comparative ink jet heads was found to often cause non-discharge of ink and defective prints. As for each comparative ink jet head having been subjected to the continuous printing test, observation was conducted of its portions in the vicinity of the discharging outlets. As a result, it was found that the ink flow path walls were debonded from the base member (that is, the substrate for an ink jet head) as shown in FIG. 3(b).

Comparative Example 2

The procedures of Example 1 were repeated, except that Sample N obtained in Experiment 14 was used as the ink flow path wall-forming material for an ink jet head, to thereby obtain a plurality of comparative ink jet heads.

Each of the resultant comparative ink jet heads was subjected to a continuous printing test, wherein printing was continuously conducted for 1000 hours using highly alkaline ink of pH 10.7 (composed of 10.0 wt. % of GLY, 5.0 wt. % of urea, 5.0 wt. % of IPA, 0.4 wt. % of lithium hydroxide, 0.5 wt. % of ammonium sulfate, and 79.9 wt. % of water).

As a result, each of the comparative ink jet heads was found to often cause non-discharge of ink and defective prints. As for each comparative ink jet head having been subjected to the continuous printing test, observation was conducted of its portions in the vicinity of the discharging outlets. As a result, it was found that the ink flow path walls were debonded from the base member (that is, the substrate for an ink jet head) as shown in FIG. 3(b).

From the above described results, it is understood that the foregoing resin composition (a) according to the present invention (comprising the foregoing hardening epoxy resin (b) in the liquid state at room temperature as a main component and the foregoing specific siloxane bond possessing epoxy resin (c)) enables formation of high quality ink flow path walls for an ink jet head which are free from occurrence of debonding from the substrate even when highly alkaline ink and that an ink jet head having the high quality ink flow path walls excels in ink discharging performance wherein stable ink discharging can be continuously conducted over a long period of time to continuously provide high quality prints even when highly alkaline ink is used.

TABLE 1

|  | Exp. 1 | Exp. 2 | Exp. 3 | Exp. 4 | Exp. 5 | Exp. 6 | Exp. 7 | Exp. 8 | Exp. 9 | Exp. 10 | Exp. 11 | Exp. 12 |
|---|---|---|---|---|---|---|---|---|---|---|---|---|
| bisphenol A type epoxy resin (Epikote 828) | 75 | 75 |  |  | 95 | 85 | 65 | 60 | 50 |  |  |  |
| bisphenol AD type epoxy resin (Epomic R710) |  |  | 90 | 90 |  |  |  |  |  | 95 | 90 | 60 |
| 1,3-bis(3-glycidoxypropyl)tetramethyldisiloxane | 25 |  | 10 |  | 5 | 15 | 35 | 40 | 50 |  |  |  |
| 1,1,3,3-tetramethyl-1,3-diglycidyletherdisiloxane |  | 25 |  | 10 |  |  |  |  |  | 5 | 10 | 40 |
| flexibilizer (Epolite 3002) |  |  |  |  |  |  |  |  |  |  |  |  |
| thermohardening agent (Fujicure FXK830) | 50 |  |  | 50 | 50 | 50 | 50 | 50 | 50 |  |  |  |
| thermohardening agent (Epomic Q614) |  | 28 | 28 |  |  |  |  |  |  | 28 | 28 | 28 |
| photo-curing agent (Adeka Optomer SP-170) |  |  |  |  |  |  |  |  |  |  |  |  |
| adhesion (banding property) (ordinary ink) | O | O | O | O | X | O | O | O | O | X | O | O |
| adhesion (bonding property) (highly alkaline ink) | O | O | O | O | X | O* | O | O | O | X | O | O |
| form retention | O | O | O | O | O | O | O | O | X | O | O | O |
| total evaluation | O | O | O | O | X | O | O | O | X | X | O | O |

|  | Exp. 13 | Exp. 14 | Exp. 15 | Exp. 16 | Exp. 17 | Exp. 18 | Exp. 19 | Exp. 20 | Exp. 21 | Exp. 22 |
|---|---|---|---|---|---|---|---|---|---|---|
| bisphenol A type epoxy resin (Epikote 828) | 100 | 75 | 75 |  | 95 |  | 60 |  | 100 | 75 |
| bisphenol AD type epoxy resin (Epomic R710) |  |  |  | 80 |  | 90 |  | 50 |  |  |
| 1,3-bis(3-glycidoxypropyl)tetramethyldisiloxane |  |  | 25 |  |  | 10 | 40 |  |  |  |
| 1,1,3,3-tetramethyl-1,3-diglycidyletherdisiloxane |  |  |  | 20 | 5 |  |  | 50 |  |  |
| flexibilizer (Epolite 3002) |  | 25 |  |  |  |  |  |  |  | 25 |
| thermohardening agent (Fujicure FXK830) | 50 | 50 |  |  |  |  |  |  |  |  |
| thermohardening agent (Epomic Q614) |  |  |  |  |  |  |  |  |  |  |
| photo-curing agent (Adeka Optomer SP-170) |  |  | 1.5 | 1.5 | 1.5 | 1.5 | 1.5 | 1.5 | 1.5 | 1.5 |
| adhesion (banding property) (ordinary ink) | X | O | O | O | X | O | O | O | X | O |
| adhesion (bonding property) (highly alkaline ink) | X | X | O | O | X | O | O | O | X | X |
| form retention | O | O | O | O | O | O | O | X | O | O |
| total evaluation | X | X | O | O | X | O | O | X | X | X |

*: partial removal observed.

What is claimed is:

1. An ink jet head including a plurality of discharging outlets serving to discharge ink; a substrate for an ink jet head, said substrate including a plurality of energy generating elements capable of generating energy for discharging ink from said plurality of discharging outlets and wiring electrically connected to said energy generating elements; and a plurality of ink pathways each having an ink flow path wall forming one of the ink pathways by joining to said substrate, characterized in that said ink flow path wall-forming material comprises a resin composition which is in the liquid state at 25° C., said resin composition comprising (i) a hardening epoxy resin having a viscosity of 10 to 100,000 cps at 25° C. as a main component of the resin composition and (ii) an epoxy resin with a diepoxide structure having a siloxane bond.

2. An ink jet head according to claim 1, wherein the epoxy resin with a diepoxide structure having a siloxane bond is of the following structural formula (I) or (II)

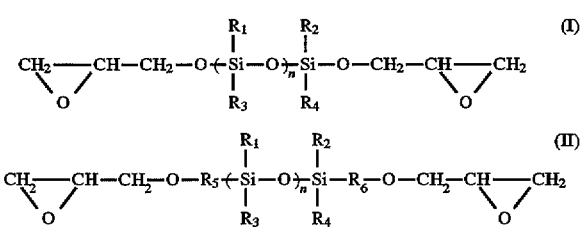

wherein, each of $R_1$ to $R_4$ is an alkyl group of 1 to 4 carbon atoms, an alkenyl group of 2 to 6 carbon atoms, a phenyl group, or a substituted aromatic group wherein $R_1$ to $R_4$ may be the same or different from each other; each of $R_5$ and $R_6$ is an alkylene group of 1 to 8 carbon atoms, or a phenylene group wherein $R_5$ and $R_6$ may be the same or different from each other; and n is an integer of 1 to 1000.

3. An ink jet head according to claim 1, wherein the resin composition is thermally curable.

4. An ink jet head according to claim 3, wherein the resin composition contains an amine series curing agent.

5. An ink jet head according to claim 3, wherein the resin composition contains a silane coupling agent.

6. An ink jet head according to claim 5, wherein the silane coupling agent is in an amount of 3 to 10 parts by weight versus 100 parts by weight of the resin composition.

7. An ink jet head according to claim 1, wherein the resin composition is photo-curable.

8. An ink jet head according to claim 7, wherein the resin composition contains a compound which produces a cation upon irradiation of light.

9. An ink jet head according to claim 7, wherein the resin composition contains a silane coupling agent.

10. An ink jet head according to claim 9, wherein the silane coupling agent is in an amount of 1 to 10 parts by weight versus 100 parts by weight of the resin composition.

11. An ink jet head according to claim 1, wherein the epoxy resin with a diepoxide structure having a siloxane bond is in an amount of 10 to 40 parts by weight versus a total amount of the resin composition.

12. An ink jet head according to claim 1, wherein the hardening epoxy resin is of a molecular weight of 300 or more.

13. An ink jet head according to claim 1, wherein the hardening epoxy resin has a viscosity of 10 to 100,000 cps.

14. An ink jet head according to claim 1, wherein each heat generating element comprises an electrothermal converting element which generates thermal energy.

15. An ink jet head according to claim 1, wherein each heat generating element comprises a piezo electric element.

16. An ink jet head according to claim 1 which is a full-line type ink jet head having a length corresponding to an entire width of the printing area of a printing medium on which printing is conducted.

17. An ink jet apparatus comprising: an ink jet head including a plurality of discharging outlets serving to discharge ink to a printing medium on which printing is to be conducted; a substrate for an ink jet head, said substrate including a plurality of energy generating elements capable of generating energy for discharging ink from said plurality of discharging outlets and wiring electrically connected to said energy generating elements, and a plurality of ink pathways each having an ink flow path wall forming one of the ink pathways by joining to said substrate; and a means for transporting said printing medium, characterized in that said ink flow path wall-forming material comprises a resin composition which is in the liquid state at 25° C., said resin composition comprising (i) a hardening epoxy resin having a viscosity of 10 to 100,000 cps at 25° C. as a main component of the resin composition and (ii) an epoxy resin with a diepoxide structure having a siloxane bond.

18. An ink jet head obtained by forming a solid layer having an ink pathway-forming pattern on a substrate for an ink jet head, a plurality of energy generating elements capable of generating energy for discharging ink from a plurality of discharging outlets and wiring electrically connected to said energy generating elements, applying a hardening ink flow path wall-forming material onto said substrate so as to cover the entirety of said solid layer formed on said substrate, hardening said hardening ink flow path wall-forming material applied, and removing said solid layer to form a plurality of ink pathways, characterized in that said ink flow path wall-forming material comprises a resin composition which is in the liquid state at 25° C., said resin composition comprising (i) a hardening epoxy resin having a viscosity of 10 to 100,000 cps at 25° C. as a main component of the resin composition and (ii) an epoxy resin with a diepoxide structure having a siloxane bond.

19. An ink jet head according to claim 18, wherein the epoxy resin with a diepoxide structure having a siloxane bond is of the following structural formula (I) or (II)

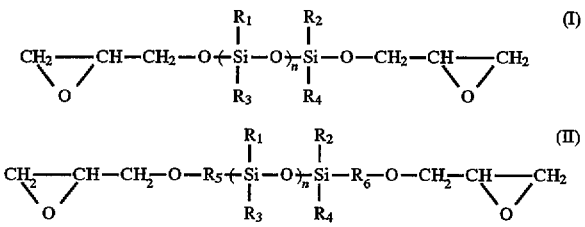

wherein, each of $R_1$ to $R_4$ in an alkyl group of 1 to 4 carbon atoms, an alkenyl group of 2 to 6 carbon atoms, a phenyl group, or a substituted aromatic group wherein $R_1$ to $R_4$ may be the same or different from each other; each of $R_5$ and $R_6$ is an alkylene group of 1 to 8 carbon atoms, or a phenylene group wherein $R_5$ and $R_6$ may be the same or different from each other; and n is an integer of 1 to 1000.

20. An ink jet head according to claim 18, wherein the resin composition is thermally curable.

21. An ink jet head according to claim 20, wherein the resin composition contains an amine series curing agent.

22. An ink jet head according to claim 20, wherein the resin composition contains a silane coupling agent.

23. An ink jet head according to claim 22, wherein the silane coupling agent is in an amount of 3 to 10 parts by weight versus 100 parts by weight of the resin composition.

24. An ink jet head according to claim 18, wherein the resin composition is photo-curable.

25. An ink jet head according to claim 24, wherein the resin composition contains a compound which produces a cation upon irradiation of light.

26. An ink jet head according to claim 24, wherein the resin composition contains a silane coupling agent.

27. An ink jet head according to claim 26, wherein the silane coupling agent is in an amount of 1 to 10 parts by weight versus 100 parts by weight of the resin composition.

28. An ink jet head according to claim 18, wherein the epoxy resin with a diepoxide structure having a siloxane bond is in an amount of 10 to 40 parts by weight versus a total amount of the resin composition.

29. An ink jet head according to claim 18, wherein the hardening epoxy resin is of a molecular weight of 300 or more.

30. An ink jet head according to claim 18, wherein the hardening epoxy resin has a viscosity of 10 to 100,000 cps.

31. An ink jet head according to claim 18, wherein each heat generating element comprises an electrothermal converting element which generates thermal energy.

32. An ink jet head according to claim 18, wherein each heat generating element comprises a piezo electric element.

33. An ink jet head according to claim 18 which is a full-line type ink jet head having a length corresponding to an entire width of the printing area of a printing medium on which printing is conducted.

34. An ink jet apparatus comprising: an ink jet head having a plurality of discharging outlets serving to discharge ink to a printing medium on which printing is to be conducted, and a means for transporting said printing medium; said ink jet head being obtained by forming a solid layer having an ink pathway-forming pattern on a substrate for an ink jet head, a plurality of energy generating elements capable of generating energy for discharging ink from said plurality of discharging outlets and wiring electrically connected to said energy generating elements, applying a hardening ink flow path wall-forming material onto said substrate so as to cover the entirety of said solid layer formed on said substrate, hardening said hardening ink flow path wall-forming material applied, and removing said solid layer to form a plurality of ink pathways, characterized in that said ink flow path wall-forming material comprises a resin composition which is in the liquid state at 25° C., said resin composition comprising (i) a hardening epoxy resin having a viscosity of 10 to 100,000 cps at 25° C. as a main component of the resin composition and (ii) an epoxy resin with a diepoxide structure having a siloxane bond.

* * * * *

UNITED STATES PATENT AND TRADEMARK OFFICE
CERTIFICATE OF CORRECTION

PATENT NO. : 5,663,752

DATED : September 2, 1997

INVENTOR(S): ISAO IMAMURA, ET AL.

It is certified that error appears in the above-identified patent and that said Letters Patent is hereby corrected as shown below:

ON THE COVER PAGE:

Item [56] U.S. PATENT DOCUMENTS

"Matsushita" should read --Matsuhisa--.

COLUMN 1:

Line 32, "head" should read --heat--.

COLUMN 2:

Line 21, "that a" should read --that--.
    Line 38, "in" should be deleted.
    Line 42, "wherein" (second occurrence) should be deleted.
    Line 44, "with the" should read --with a--.

COLUMN 3:

Line 28, "and in" should read --and is in--.

COLUMN 4:

Line 27, "wherein" should read --where--.

UNITED STATES PATENT AND TRADEMARK OFFICE
CERTIFICATE OF CORRECTION

PATENT NO. : 5,663,752

DATED : September 2, 1997

INVENTOR(S): ISAO IMAMURA, ET AL.

It is certified that error appears in the above-identified patent and that said Letters Patent is hereby corrected as shown below:

COLUMN 6:

Line 50, "comprise" should read --comprises--.

COLUMN 7:

Line 52, "the each;" should read --each other;--.

COLUMN 8:

Line 7, "salt and" should read --salt formed and--.
    Line 16, "flowpath" should read --flow path--.

COLUMN 9:

Line 6, "bubble" should read --bubbles--.
    Line 35, "2(a)-2," should read --FIGS. 2(a)-2,--.
    Line 53, "2(a')-2," should read --2(a)-2,--.
    Line 67, "2(a')-2," should read --2(a)-2,--.

COLUMN 10:

Line 2, "2(a')-2," should read --2(a)-2,--.
    Line 26, "2(a')-2," should read --2(a)-2),--.
    Line 30, "2(b')-2," should read --2(b)-2),--.
    Line 31, "2(b')-2," should read --2(b)-2,--.

UNITED STATES PATENT AND TRADEMARK OFFICE
CERTIFICATE OF CORRECTION

PATENT NO.  : 5,663,752

DATED       : September 2, 1997

INVENTOR(S) : ISAO IMAMURA, ET AL.

It is certified that error appears in the above-identified patent and that said Letters Patent is hereby corrected as shown below:

COLUMN 10:

Line 44, "photoresist" should read --photoresists--.
    Line 46, "2(c')-2," should read --2(c)-2),--.
    Line 54, "2(e')-2," should read --2(e)-2),--.

COLUMN 11:

Line 10, "2(f)-2," should read --2(f)-2),--.
    Line 16, "2(g')-2" should read --2(g)-2)--.
    Line 20, "of ink" should read --of the ink--.
    Line 32, "2(g')-2," should read --2(g)-2),--.
    Line 44, "2(h')-2." should read --2(h)-2).--.
    Line 46, "2(j')-2," should read --2(j)-2),--.

COLUMN 13:

Line 4, "construction" should read --constructions--.
    Line 8, "construction" should read --constructions--.

COLUMN 20:

Line 15, "modulus," should read --modulus--.

UNITED STATES PATENT AND TRADEMARK OFFICE
CERTIFICATE OF CORRECTION

PATENT NO. : 5,663,752

DATED : September 2, 1997

INVENTOR(S) : ISAO IMAMURA, ET AL.

It is certified that error appears in the above-identified patent and that said Letters Patent is hereby corrected as shown below:

COLUMN 21:

Line 4, "peels" should read --it peels--.
    Line 7, "causes" should read --cause--.
    Line 40, "reduce" should read --reduces--.
    Line 41, "such" should be deleted.

COLUMN 22:

Line 3, "of a" should read --of the--.
    Line 4, "taken-in" should read --take-in-- and "substrate" should read --substrate,--.
    Line 16, "ink," should read --ink is used,--.
    Line 61, "to" should read --to a--.

COLUMN 24:

Line 57, "ink and" should read --ink is used and--.

UNITED STATES PATENT AND TRADEMARK OFFICE
CERTIFICATE OF CORRECTION

PATENT NO. : 5,663,752

DATED : September 2, 1997

INVENTOR(S) : ISAO IMAMURA, ET AL.

It is certified that error appears in the above-identified patent and that said Letters Patent is hereby corrected as shown below:

COLUMN 25:

TABLE 1

Lines 22 and 44, "(banding" should read --(bonding--.

Signed and Sealed this

Twelfth Day of January, 1999

Attest:

*Attesting Officer*  *Acting Commissioner of Patents and Trademarks*